United States Patent
Wang et al.

(10) Patent No.: US 12,539,033 B2
(45) Date of Patent: Feb. 3, 2026

(54) OPHTHALMIC IMAGING WITH K-MIRROR SCANNING, EFFICIENT INTERFEROMETRY, AND PUPIL ALIGNMENT THROUGH SPATIAL FREQUENCY ANALYSIS

(71) Applicants: Carl Zeiss Meditec, Inc., Dublin, CA (US); Carl Zeiss Meditec AG, Jena (DE)

(72) Inventors: Yingjian Wang, Fremont, CA (US); Yuan Liu, Dublin, CA (US); Jochen Straub, Pleasanton, CA (US); Mahsa Darvishzadeh Varcheie, Fremont, CA (US); Conor Leahy, Dublin, CA (US)

(73) Assignees: CARL ZEISS MEDITEC, INC., Dublin, CA (US); CARL ZEISS MEDITEC AG, Jena (DE)

( * ) Notice: Subject to any disclaimer, the term of this patent is extended or adjusted under 35 U.S.C. 154(b) by 804 days.

(21) Appl. No.: 17/628,107

(22) PCT Filed: Jul. 30, 2020

(86) PCT No.: PCT/EP2020/071530
§ 371 (c)(1),
(2) Date: Jan. 18, 2022

(87) PCT Pub. No.: WO2021/019025
PCT Pub. Date: Feb. 4, 2021

(65) Prior Publication Data
US 2022/0257111 A1     Aug. 18, 2022

Related U.S. Application Data

(60) Provisional application No. 62/881,754, filed on Aug. 1, 2019.

(51) Int. Cl.
A61B 3/14     (2006.01)
A61B 3/00     (2006.01)
(Continued)

(52) U.S. Cl.
CPC ............ *A61B 3/102* (2013.01); *A61B 3/0008* (2013.01); *A61B 3/0058* (2013.01); *A61B 3/12* (2013.01);
(Continued)

(58) Field of Classification Search
CPC ..... A61B 3/102; A61B 3/0008; A61B 3/0058; A61B 3/12; A61B 3/1233; A61B 3/14; A61B 3/152; A61B 5/7257; G02B 26/105
(Continued)

(56) References Cited

U.S. PATENT DOCUMENTS

| 4,355,871 A | 10/1982 | Nevyas et al. |
| 5,537,162 A * | 7/1996 | Hellmuth ............. G01B 9/0203 351/221 |

(Continued)

FOREIGN PATENT DOCUMENTS

| JP | H03-066356 | 3/1991 |
| JP | H08-098813 | 4/1996 |

(Continued)

OTHER PUBLICATIONS

Japan Patent Office; Japanese Office Action dated Apr. 5, 2024 in Application No. 2022-505616.

*Primary Examiner* — Mahidere S Sahle
(74) *Attorney, Agent, or Firm* — SNELL & WILMER L.L.P.

(57) ABSTRACT

Various techniques for providing a low-cost ophthalmic imaging system, such an OCT or fundus imagers are presented. Cost is reduced by using a K-minor as a scanning component. The K-mirror is positioned at a retina conjugate.

(Continued)

A beam splitter is positioned at the pupil conjugate and may be used to provide pupil splitting functionality. The beam splitter's shape and area conform to the focal light footprint of an illumination source such that it spans only a fraction of a collection window. 2D FFT is applied to capture spectra for purposes of selectively removing complex conjugate components and for extracting patient pupil to system collection pupil alignment. Consequently, pupil alignment is achieved by use of captured OCT data without the need for additional pupil cameras.

22 Claims, 20 Drawing Sheets

(51) Int. Cl.
  *A61B 3/10* (2006.01)
  *A61B 3/12* (2006.01)
  *A61B 3/15* (2006.01)
  *A61B 5/00* (2006.01)
  *G02B 26/10* (2006.01)

(52) U.S. Cl.
  CPC .............. *A61B 3/1233* (2013.01); *A61B 3/14* (2013.01); *A61B 3/152* (2013.01); *A61B 5/7257* (2013.01); *G02B 26/105* (2013.01)

(58) Field of Classification Search
  USPC ......................................................... 351/206
  See application file for complete search history.

(56) References Cited

U.S. PATENT DOCUMENTS

| | | | |
|---|---|---|---|
| 2005/0286019 A1* | 12/2005 | Wiltberger | A61B 3/102 351/205 |
| 2006/0114411 A1* | 6/2006 | Wei | A61B 3/156 351/205 |
| 2007/0291277 A1 | 12/2007 | Everett et al. | |
| 2015/0077710 A1* | 3/2015 | Saito | G06T 7/246 351/221 |
| 2017/0227350 A1* | 8/2017 | Sarunic | G01B 9/02063 |
| 2017/0251919 A1* | 9/2017 | Plaian | A61B 3/024 |
| 2018/0242838 A1* | 8/2018 | Sarunic | G02B 21/0076 |
| 2018/0299251 A1* | 10/2018 | Liba | G02B 27/48 |

FOREIGN PATENT DOCUMENTS

| | | |
|---|---|---|
| JP | 2006068036 | 3/2006 |
| JP | 2008518740 | 6/2008 |

* cited by examiner

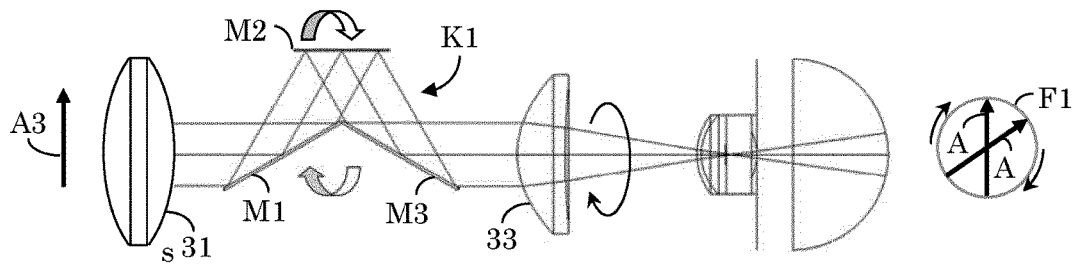
FIG. 5
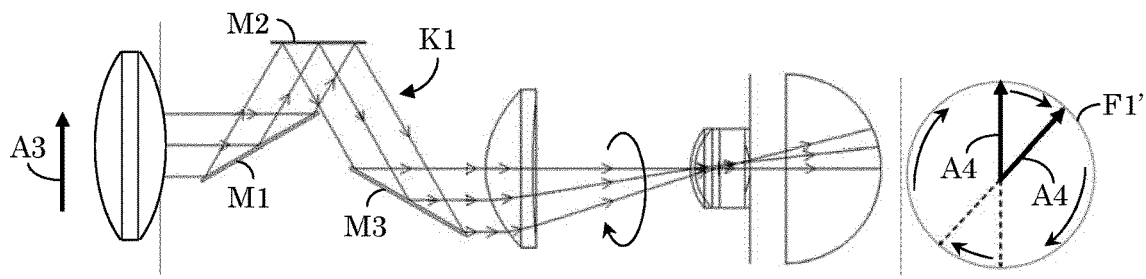
FIG. 6
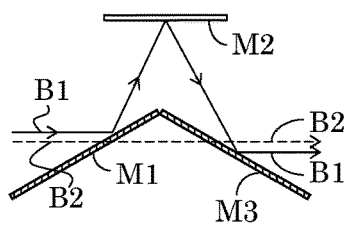   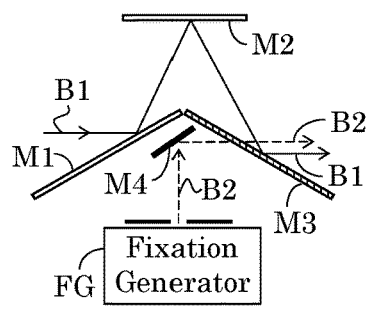   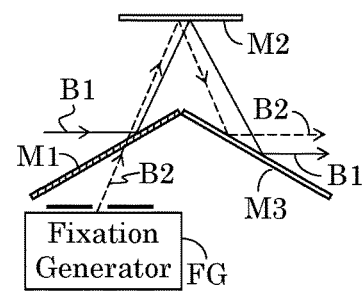
FIG. 8    FIG. 9    FIG. 10
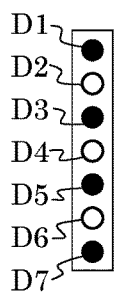   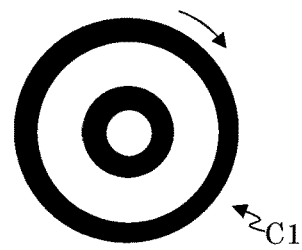   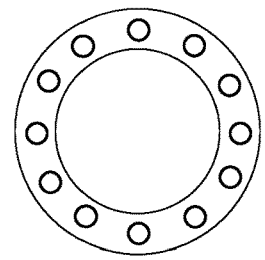
FIG. 11    FIG. 12

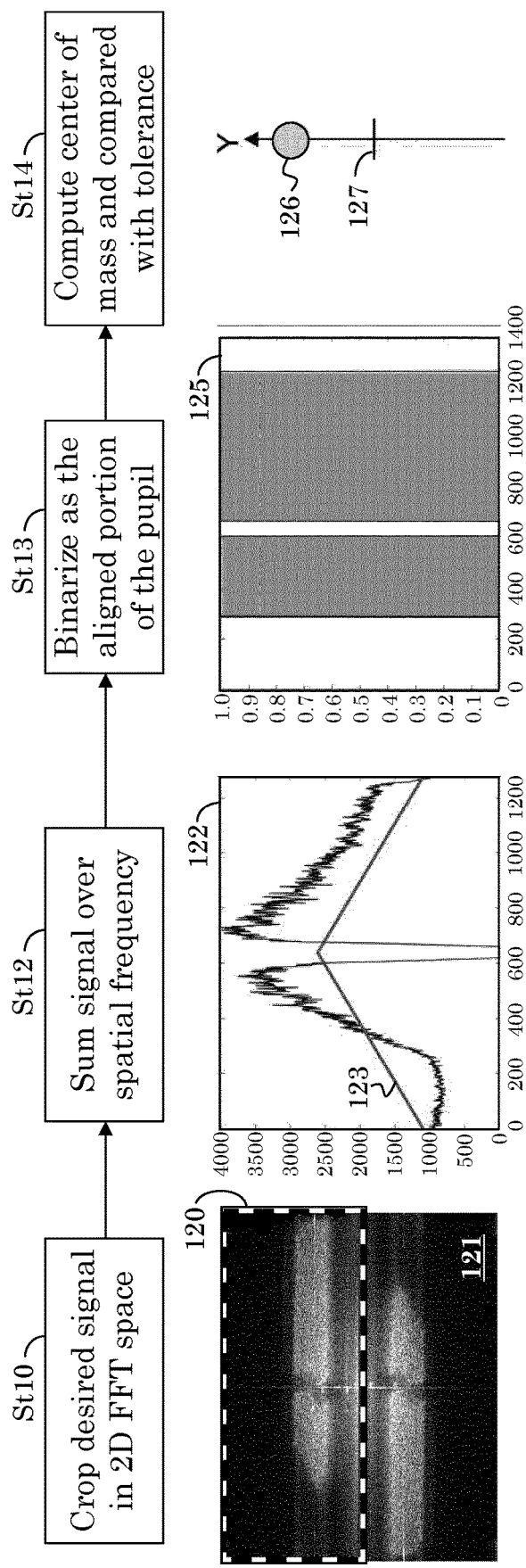
FIG. 44
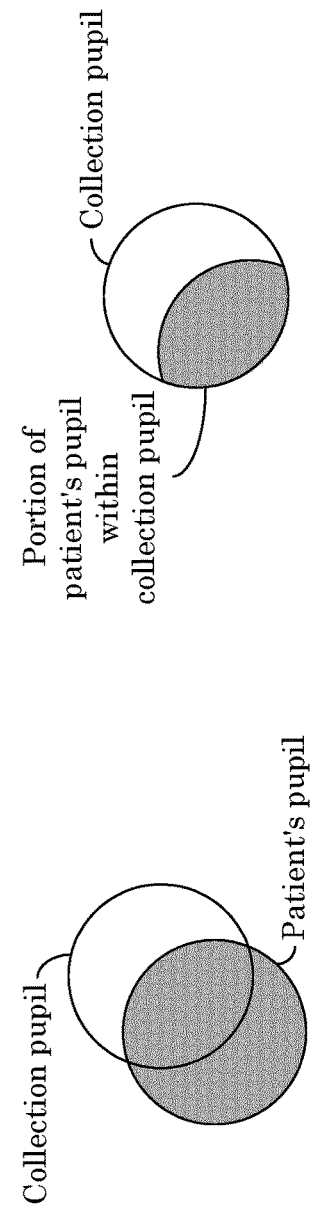
FIG. 46
FIG. 45
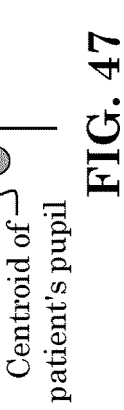
FIG. 47

OPHTHALMIC IMAGING WITH K-MIRROR SCANNING, EFFICIENT INTERFEROMETRY, AND PUPIL ALIGNMENT THROUGH SPATIAL FREQUENCY ANALYSIS

PRIORITY

This application is a National Phase application under 35 U.S.C. § 371 of International Application No. PCT/EP2020/071530, filed Jul. 30, 2020, which claims priority to U.S. Provisional Application Ser. No. 62/881,754, filed Aug. 1, 2019, the contents of which are hereby incorporated by reference in their entirety.

FIELD OF INVENTION

The present invention is generally directed to the field of ophthalmic imaging systems. More specifically, it is directed to ophthalmic imaging systems with simplified scanning components, reduced designed constraints, and facilitated patient-to-system alignment.

BACKGROUND

Early diagnosis is critical for the successful treatment of various eye diseases. Optical imaging is a preferred method for non-invasive examination of the retina. Optical imaging may be used to identify major causes of vision loss, such as age-related macular degeneration, diabetic retinopathy, and glaucoma, but diagnosis is often not made until after damage has manifested itself. A goal of ophthalmic medical care is to identify possible pathologies at a pre-clinical stage of disease. An obstacle to this goal is the complexity and cost of advanced optical imaging systems for ophthalmic use (e.g., ophthalmic imaging systems), which limit their availability.

There are various types of ophthalmic imaging systems, such as fundus imaging systems (e.g., fundus imagers) and Optical Coherence Tomography (OCT) systems (see for example U.S. Pat. Nos. 4,170,398, 4,732,466, PCT Publication No. 2012059236, US Patent Application No. 2014/0232987, and US Patent Publication No. 2015/0131050). Fundus imagers and OCT systems can provide in vivo imaging of anterior and posterior regions of the human eye, e.g., the cornea, retina, etc. Fundus imagers are typically used to capture two-dimensional (2D) superficial images, and may be used to image the fundus, which is the interior surface of the eye opposite the eye lens and may include the retina, optic disc, macula, fovea, and posterior pole. OCT systems may capture three-dimensional (3D) information and generate 2D and/or 3D, depth-resolved images therefrom.

Although different in their fundamental implementation, fundus imagers and OCT systems share some complexities. Both may require complex scanning components for gathering imaging information (e.g., light), and both have a limited amount of optical power so optimizing light throughput is desirable. Both have critical requirements regarding the positioning of various optical components. For example, multiple optical components may need to be at the same conjugate plane, which may necessitate the creation of additional optical relays to define additional conjugate planes. Further complexity may arise from the need to provide an alignment mechanism to align the ophthalmic imaging system to a patient's eye (e.g., pupil alignment), and/or to provide a fixation point to direct a patient's gaze. These difficulties complicate their design and construction, leading to higher cost.

It is an object of the present invention to provide an ophthalmic imaging system of reduced complexity and cost.

It is another object of the present invention to provide a simplified and versatile scanning mechanism for an ophthalmic imaging system.

It is a further object of the present invention to provide an architecture to mitigate optical power loss in an imaging optical relay.

It is still another object to reduce the number of components needed to provide system-to-patient alignment and/or a fixation point.

SUMMARY OF INVENTION

The above objects are met in an ophthalmic imaging system with simplified rotational and/or linear scanning, relaxed design constraints, efficient line-field and/or full-field and/or partial-field interferometry, and simplified system-to-patient alignment. The complications and costs associated with galvanometer scanners may be avoided by using a K-mirror as the scanning component. Use of a K-mirror also avoids any aberration issues associated with prisms, such as from a dove prism, which permits the K-mirror to be located in a non-collimated optical path of the ophthalmic imaging system. For example, the K-mirror may be positioned such that an intermediate focal point of scattered light exiting an eye is located within the K-mirror (structure). Furthermore, the present implementation removes the task of pupil splitting from the scanning component, freeing it to be located at any convenient position and not being restricted to a pupil conjugate plane. Consequently, the present K-mirror may be positioned between a scan lens and an ocular lens, which is the lens closest to the eye. These reduced restrictions on the scanning component provide for reduced design constraints and ease of manufacture.

Using the K-mirror for rotation scanning allows it to be used for modulating the length of an available scan line. By moving one of the three mirrors of the K-mirror structure, the output scan line is offset along its radial direction from its center of rotation. This permits the creation of annular scan patterns, and/or the extension of the scan line length by as much as a factor of two.

Alternatively, or additionally, the K-mirror may be moved in a reciprocating motion, e.g., up-and-down, to achieve linear scanning. This reciprocating motion causes an input scan beam (e.g., a scan line input to the K-mirror) to reflect off of different positions on the input-facing mirror of the K-mirror structure, causing it to reflect off different positions on the output-facing mirror of the K-mirror structure, and thereby offsets the output position of the output scan beam. In this manner, the output scan beam may be made to scan across a sample, at least along one translational dimension. The present K-mirror may also be combined with a second scanning component, such as a second K-mirror, a galvanometer scanner, etc., so as to produce two-dimensional translational scanning. For example, a scan beam output from a first scanning component that provides scanning along a first translational direction may be input to a K-mirror that provides scanning along a second translational direction.

Furthermore, one or more of the mirrors of the K-mirror structure may be made reflective on one side and transparent on an opposite side. The reflective side may be chosen to face the interior of the K-mirror structure. This may be achieved, for example, by applying to, or embedding within, a glass sheet a thin layer of a reflective and almost transparent material (e.g., a dielectric coating, such as aluminum). In this manner, a second input portal (from the transparent side) is created for the K-mirror structure. A fixation pattern may be inputted to the K-mirror through this second input portal. Additionally, by affixing the mechanism that generates the fixation pattern to the K-mirror such that both move in tandem, their positions relative to each other remain constant. In this manner, the position of a fixation pattern, as perceived by a patient during a scanning process, may remain constant.

Efficient interferometry (e.g., line-field interferometry and/or flying spot/point-scanning and/or full-field interferometry and/or partial-field interferometry) may be provided by use of a novel beam splitter (or beam divider) configuration, wherein the beam splitter spans an area about the same size as (and preferably not smaller than) the beam footprint (or focal area, or light footprint, or wave-front) of an incident light beam. In this manner, the incident light beam is divided into a reference beam along a reference arm and a sample beam along a sample arm. For example, if the imaging system is using line scanning, then the beam splitter preferably has a slit (or linear) shape of minimal size sufficient for surrounding the scan line as it traverses the beam splitter. Alternatively, if the imaging system uses a full-field imager (or point scanner), then the beam splitter preferably has a disc (or dot) shape of minimal size sufficient for surrounding the focal point of the illumination light as it traverses the beam splitter. The size of the beam splitter is minimized so as to maximum the amount of collection (e.g. scattered) light returning from a sample and passing by the beam splitter (e.g., its conjugate plane) without traversing the beam splitter (or the relative position of the beam splitter within its conjugate plane). In other words, the beam splitter may be designed to provide as small an obstacle as practical to scattered light returning from the sample being imaged. Stated differently, the wave-front of (e.g., collimated) light returning from the sample arm spans an area extending beyond the area of the beam splitter, and preferably enveloping (or spanning one or more hemispherical sides of) the beam splitter. As it would be understood, any returning light from the sample arm that passes through the beam splitter is attenuated by the beam splitter, but since most of the returning light from the sample arm passes by the beam splitter unabated by the beam splitter (e.g., the area of the beam splitter may be less than 5% of the area of the wave-front (e.g. size of a system collection pupil) of the returning light from sample arm), the majority of the returning sample signal strength is preserved.

Additionally, the beam splitter may be positioned to provide a pupil splitting function, if needed, of the imaging system so as to relieve the scanning component from this task. As it may be understood, it is easier to position the beam splitter, which is small and static, at a pupil conjugate plane and define illumination and collection regions for pupil splitting than it is to place one or more moving scanning components at a pupil conjugate plane and define an imaging region (or window) and a collection region (or window) for pupil splitting.

Efficient interferometry may further be provided by positioning a physical collection aperture (e.g. system pupil stop) at a pupil conjugate plane of a patient's eye to define a mechanical collection pupil. Optionally, the physical collection aperture may be made to have a modular configuration. The collection aperture may selectively be changed from an on-axis configuration to an off-axis configuration, and vice versa. That is, the mechanical collection pupil may convert collected light (returning from the beam splitter toward a collector or camera) from having an on-axis configuration to having an off-axis configuration. The on-axis configuration permits the maximum amount of light available to reach the collector, but depth information provided by such light may be reduced by the appearance of a complex conjugate image. The off-axis configuration may reduce the amount of available light reaching the collector, but avoids the creation of a complex conjugate image and thereby achieve higher depth resolution (e.g., full-range A-scans or B-scans). That is, applying a 2D fast Fourier transfer (FFT) to the collected light from the off-axis configuration provides a spatial frequency distribution of scattered light at the collection aperture (e.g., corresponding to the patient's pupil conjugate). This spatial frequency distribution separates true signal components from their complex conjugate components, which facilitates the selection of true signal information (that does not include complex conjugate components) for processing.

As it would be understood by one versed in the art, a first type of spectral analysis (e.g., 1D FFT) is typically applied to the collected sample light (e.g. interference light) to recover depth information of a scan beam. However as stated above, by applying a second type of spectral analysis (e.g., 2D FFT) to the collected sample light, spatial characteristics of collected light (e.g., at the collection aperture on a pupil conjugate plane) returning from the sample arm may be recovered. As explained above, this information may be used to select spectral information that does not include complex conjugate components, but this information may further be used for alignment of the imaging system to a patient. That is, these spatial characteristics may be correlated to a position of a patient's eye (e.g., the patient's pupil) relative to the ophthalmic imaging device (e.g., the device's collection aperture). It has been found that this spectral analysis may be used to determine both translational and axial positions of an eye relative to the ophthalmic imaging device. In this manner, the scanning mechanism of the ophthalmic imaging device may, at least partially, determine proper alignment of the patient to the ophthalmic imaging device without the need for additional, customary alignment equipment, such as a pupil camera and its associated hardware/software. In this manner, the present system may provide automated pupil alignment based at least in part on the spectral analysis.

Other objects and attainments together with a fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g. system, can be claimed in another claim category, e.g. method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts:

FIG. 5 illustrates the present K-mirror positioned in a non-collimated path between a scan lens and an ocular lens.

FIG. 6 illustrates the creation of an off-axis scan in the ophthalmic imaging system by offsetting one of the three mirrors of the K-mirror.

FIG. 8 illustrates an implementation of a K-mirror module with two input light beams, B1 and B2.

FIG. 9 provides an alternate embodiment where mirror M3 is made reflective to first beam B1, and made transmissive to second beam B2 (e.g., visible light).

FIG. 10 provides a third alternate embodiment where mirror M1 is made reflective to first beam B1 on a first surface facing the interior of the K-mirror and made transmissive to second beam B2 on a second surface at the back side of the first surface (e.g., facing the exterior of the K-mirror).

FIGS. 11 and 12 illustrate two exemplary configurations for a fixation generator (second light source).

FIG. 44 shows exemplary processing steps that may be executed to determine pupil alignment from spatial frequency content.

FIGS. 45, 46, and 47 illustrate multiple implementations for representing alignment information to a user, such as via graphical user interface (GUI) on a screen/electronic display.

DESCRIPTION OF THE PREFERRED EMBODIMENTS

As is discussed more fully below, a fundus imager may provide high resolution grayscale or color images of the eye fundus, whereas optical coherence tomography (OCT) and optical coherence tomography angiography (OCTA) enable noninvasive, depth-resolved (e.g., A-scan), volumetric (e.g., C-scan), and two-dimensional (e.g., en face (frontal plane) or B-scan (transverse plane)) visualization of retinal vasculature. Generally, OCT provides structural images of tissue (e.g., vascular structure) whereas OCTA provides functional images of vasculature (e.g., blood flow). For example, OCTA may image vascular flow by using the motion of blood flow as an intrinsic contrast. For ease of discussion, a brief overview of such devices is presented, as it relates to the present improvements. A more detailed discussion of various types of ophthalmic imaging systems is provided below in section "Fundus Imaging System" and in section "Optical Coherence Tomography (OCT) Imaging System." Aspects of the present invention(s) may apply to any, or all, such ophthalmic imaging systems. For example, various embodiments are described herein as applied to an OCT system, but unless otherwise stated, it is to be understood that the improvements may be implemented within an OCTA system and/or a fundus imager.

Figure 1:
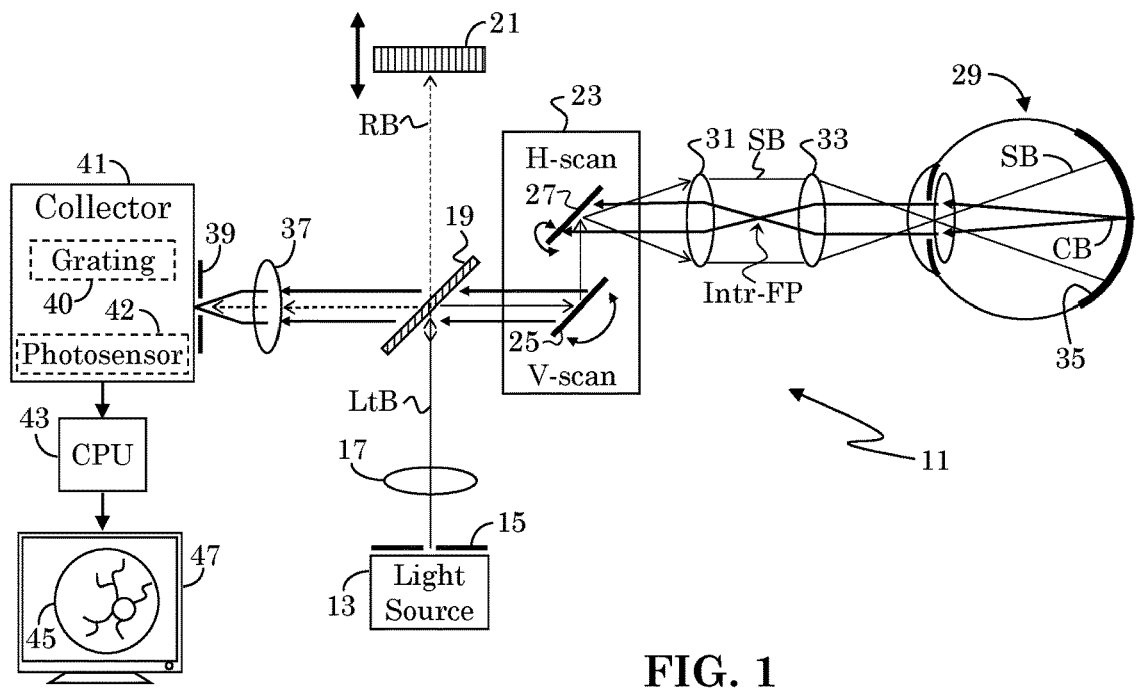
FIG. 1 illustrates a generalized, free-space, point scanning OCT system, as opposed to an OCT system that uses fiber coupler.

FIG. 1 illustrates a generalized, free-space, point scanning OCT system 11, as opposed to the OCT system of FIG. 42, which uses optical fiber and fiber coupler(s). In the present example, the OCT system includes a light source 13, such as a broadband light source with short temporal coherence length(s) or a swept laser source, that emits a light beam LtB (e.g., a spatially coherent point illumination beam) through an optional shaping aperture 15 and a collimating lens 17 to a beam splitter 19. As it is known in the art, a beam splitter is an optical device that splits/divides a beam of light in two. In the present example, a first fraction of the illumination (light) beam LtB is split (e.g., transmitted) into a reference beam RB on a reference arm (reference optical path) and a second fraction of light beam LtB is split (e.g., reflected or folded) into a sample beam SB on a sample arm (sample optical path). The reference arm may include a retro-reflector 21 with an adjustable optical delay. It is noted that generally a light beam is attenuated (e.g. loses power) each time it traverses a beam splitter. For example, a light beam may be attenuated by 50% each time it passes through (is transmitted through) beam splitter 19.

The sample arm may include a scanning component 23, which in the present example includes two galvanometers 25 and 27 (e.g., servo controlled rotating (or oscillating) mirrors). The first galvanometer (galvo) 25 may provide vertical scanning (e.g., V-scan) of the sample beam SB (e.g., provides scanning in a Y-axis direction that may define columns of sample points on a sample to be imaged), and the second galvo 27 may provide horizontal scanning (e.g., H-scan) of the sample beam (e.g., provides scanning in an X-axis direction that may define rows of sample points on the sample). For example, the H-scan galvo 27 may rotate a mirror to scan a sample beam horizontally in discrete steps (or in continuous, definable steps) to define a row of sample points. Once a row of sample points is completed, V-scan galvo 25 may rotate its mirror vertically to move the sample beam to a new, vertically offset position in preparation for scanning a new row. The optical path between the scanning component 23 and an eye 29 typically includes scan lens 31 and ocular lens (or ophthalmic lens) 33. The ocular lens is generally the lens closest to the eye and focuses the sample beam SB onto the retina 35 of eye 29. Scattered light that is to be collected (e.g., collection beam CB), exits eye 29 through its pupil and forms an intermediate focal point Intr-FP between lens 33 and lens 31 before passing through scanning component 23 to reach beam splitter 19. Because the return path of collection beam CB from eye 29 is similar to that of the sample beam SB to the eye, galvos 27 and 25 have the effect of "descanning" (or un-scanning) the returning light CB so that it is a relatively stationary, or steady, beam (non-scanning) by the time it reaches beam splitter 19.

At beam splitter 19, the returning light from the sample arm (e.g., collection beam CB) and reference arm (e.g., reference beam RB) is recombined and directed through focusing lens 37 and aperture 39 (which may block out-of-focus light) onto a collector 41 (e.g. a photodetector/photosensor 42 in the case of a time-domain (e.g., Fourier-domain) OCT or a spectrometer comprised of a grating 40 and a photosensor 42 in the case of spectral domain (SD) OCT). As it would be understood, this construct constitutes an interferometer, which superimposes beams of light to generate an interference pattern captured by the collector 41, which can be used to calculate a difference in the paths traveled by the interfering beams.

Each scan point constitutes an A-scan and is captured (or detected) separately by collector 41. As the sample beam SB from the scanning component 23 is scanned in a raster pattern across the sample, a series of A-scans are collected to construct a composite B-scan or C-scan of the retina 35. Each A-scan detected by the collector 41 may be processed by a computer, or CPU, 43 to form a B-scan, C-scan, and/or en face image. In the present example, an en face image 45 is constructed. The resultant image (A-scan, B-scan, C-scan, and/or en face image) may be displayed on a video display 47, or stored for further processing.

If the present system were a line-scanner, then the light source 13 would produce an elongated beam of light forming a line beam instead of a point beam. If the line beam spans a desired scan area in a first dimension, then the area may be imaged by scanning the line beam in a second dimension (e.g., perpendicular to the first dimension). In this case, only one of galvos 25 and 27 would be needed.

A difficulty with using beam splitter 19 in a free air OCT system is that each time light traverses the beam splitter 19, its power is attenuated. As it would be understood, it would be advantages to reduce the amount of optical power lost to beam splitter 19 before sampling the eye 29 and/or before reaching the collector 41. Another difficulty is the complexity introduced by the use of "pupil splitting", which is a technique to reduce the amount of light interference between a sample beam SB entering the eye and scattered light CB exiting the eye, as captured by collector 41.

When scanning the fundus, it is generally desirable to avoid collecting (e.g., capturing or imaging) extraneous light, as well as reflexes from the cornea and light scattering from the eye lens (e.g., such as due to cataracts). Pupil splitting blocks reflexes from the cornea and light scattering from the eye lens by providing different paths at optimally chosen regions of the pupil for the scan beam entering the eye and for the returning (scattered) light exiting the eye. For example, these regions may be chosen to avoid pupil clipping (e.g., part of a light beam being blocked by the iris whose center defines the pupil), light scattering from cataracts (e.g., clouded regions of the eye lens), and specular reflections (e.g., reflexes) of light (e.g., such as can result from a scan beam impacting the cornea as it enters the eye). In essence, pupil splitting divides the eye pupil into a pupil-sample region (or window) through which an illuminating light beam SB enters the eye (e.g., to scan a particular position on the fundus), and a pupil-collection region (or window) that determines what part of the scattered light CB exiting the eye is to be captured by the collector 41.

Typically, the scanning component 23 provides pupil splitting. Since the pupil-sample region and the pupil-collection region are imaged at the pupil, the scanning component 23 needs to be at (or close to) a conjugate plane of the pupil. In the present case, however, this would mean that galvos 25 and 27 both need to be at the pupil conjugate plane. Consequently, both need to be very close together so that both are close to the pupil conjugate plane, which complicates construction and component selection. Alternatively, additional optical relays may need to be constructed so that each galvo may be at a separate, respective pupil conjugate plane, which again complicates construction and increases component cost. It would be advantages if the requirements for positioning of the scanning component were relaxed.

Various solutions to these problems are provided below. Each solution is described separately.

Scanning Component

A first solution addresses methods to simplify the scanning component. Although the above-described OCT is a point-scanning system, other more efficient scanning systems include translational and rotating line-scanning systems. One approach to constructing a rotating line scanning system is to use a prism, e.g., a dove prism. A scanning system based on a rotating dove prism may turn a line imaging mechanism into a disk imaging mechanism by rotating the prism. An example of a dove prism used to provide rotational scanning is provided in "Dove Prism Based Rotating Dual Beam Bidirectional Doppler OCT," by Cedric Blatter, et al. (2013 OSA 1 Jul. 2013, Vol. 4, No. 7, *Biomedical Optics Express* 1188), herein incorporated by reference in its entirety. In this approach, the dove prism is positioned before a pair of galvo mirrors in the sample path, which ensures that the dove prism is within a collimated light path, and which highlights a limitation of prisms. Prisms are generally limited to collimated optical paths. That is, image rotation optics using a prism can only be placed in a collimated light path due to the significant amount of aberrations introduced if the prism were placed in a non-collimated optical path.

In ophthalmic imaging applications (e.g., fundus imagers or OCT/OCTA systems), it can be desirable to have an intermediate focus (such as intermediate focus point Intr-FP in FIG. 1) and to adjust the ocular lens (e.g., lens 33) along the optical axis to accommodate the refractive error of an eye. In this case, the space close to the intermediate focus would be a convenient location to place the scanning component (e.g., the image rotation optics). However, this is generally not a collimated light path, and thus precludes the use of a prism. Therefore, an aberration-free rotation optics device is desirable for ophthalmic imaging.

Herein is proposed the use of a K-mirror (3-mirror structure) as a scanning component, which overcomes the collimated path limitations of dove prisms. A K-mirror structure resembles a letter "K" with two reflectors joined at an angle facing an opposite third reflector. The K-mirror uses three reflections to define its property of beam inversion, and as is discussed below, is suitable rotational and transverse scanning.

Figure 2:
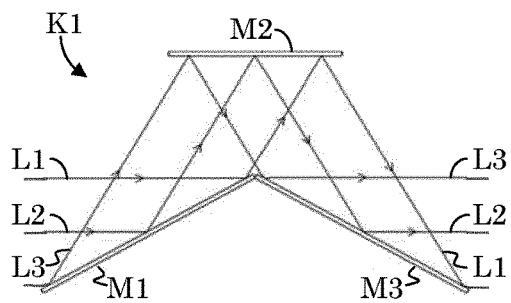
FIG. 2 provides a side view of a K-mirror module consisting of reflective surfaces, herein implemented as three mirror surfaces M1, M2, and M3.

FIG. 2 provides a side view of a K-mirror module K1 consisting of reflective surfaces, herein implemented as three mirror surfaces M1, M2, and M3. Light rays L1, L2, and L3 are shown entering and exiting the K-mirror module K1. For ease of discussion, in accord with the illustrated directions of light rays L1, L2 and L3, reflective surface M1 may be termed an input mirror (or reflective surface), M2 may be termed an intermediate mirror, and M3 may be termed an output mirror. In the implementation, light rays L1, L2, L3 enter the K-mirror, are reflected by tilted input mirror M1 towards non-tilted (flat) intermediate mirror M2, and then reflected from intermediate mirror M2 towards reversely tilted output mirror M3 to exit the K-mirror module K1 in the same direction (e.g., along the same optical axis) as the incoming light rays.

Figure 3:
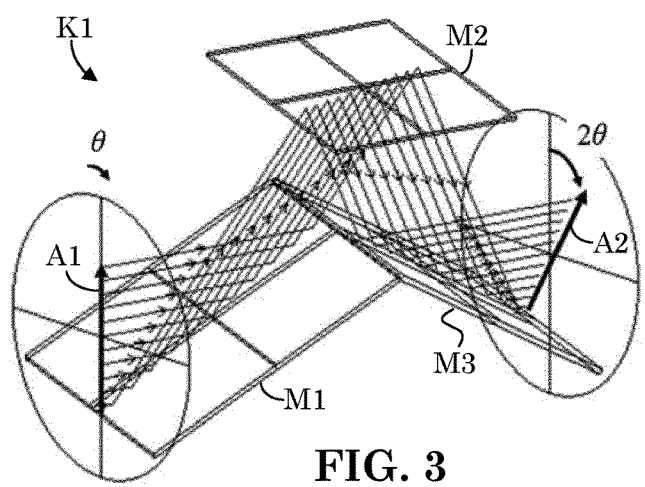
FIG. 3 provides a perspective view of a K-mirror module in rotation.

FIG. 3 provides a perspective view of K-mirror module K1 in rotation. When the whole K-mirror module is rotated about its optical axis by an angle θ, as indicated by arrow A1 at mirror M1, an input image will be rotated at the output from the K-mirror module by an angle 2θ, as indicated by arrow A2 at mirror M3. For example, an input scan line entering the K-mirror module at M1 and oriented along angle θ will exit the K-mirror module oriented along a second angle 2θ. Consequently, for every single rotation of the input scan line at mirror M1, the output scan line at mirror M3 will experience two rotations. For the return path (e.g., light beams entering the K-mirror at mirror M3 and existing at mirror M1), light beams will be reflected from M3, to M2, to M1, and be rotated back to the original orientation (e.g., be de-scanned).

Figure 4:
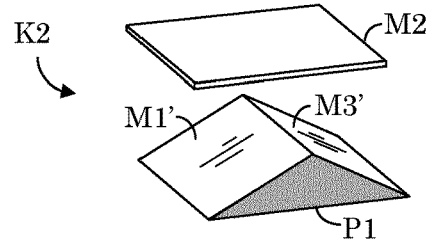
FIG. 4 provides an alternate K-mirror module including a triangular prism with reflective surfaces.

FIG. 4 provides an alternate K-mirror module K2. In this construct, input mirrors M1 and M3 of K-mirror module K1 are replaced with a triangular prism structure P1, with external surfaces M1' and M3' made reflective so that light does not pass through the prism P1 and introduce aberrations. In this implementation, mirrors M1 and M3 of K-mirror module K1 are replaced by reflective two surfaces M1' and M3' on a single prism P1, which simplifies its manufacture. Reflective surfaces M1' and M3' may be constructed by applying a reflective coating to the top surfaces of the triangular prism P1.

The present K-mirror-based scanning/rotating component is not hindered by aberrations characteristic of the dove prism, and may therefore by positioned in a collimated or non-collimated optical path. For example, as illustrated in FIG. 5, in an ophthalmic imaging application (e.g., fundus imager or OCT/OCTA system), the present K-mirror K1 may be positioned in the non-collimated path between scan lens 31 and ocular lens 33. More specifically, present K-mirror-based scanning component may be positioned such that the intermediate focus (e.g., Intr-FP from FIG. 1) is located within the K-mirror K1, e.g., within the open space along the optical path between mirrors M1, M2, and M3 or on a mirror surface. As is illustrated in frontal planar view F1, which defines the scanned field-of-view (FOV) of the iris, one may create a rotational scan A4 from a single, static line beam A3 by rotating the K-mirror K1.

The present rotation device further provides a mechanism by which to alter the scan beam. For example, as illustrated in FIG. 6, by offsetting one of the three mirrors of the K-mirror K1 (e.g., output mirror, or exit optical element, M3), one may create an off-axis scan in the ophthalmic imaging system. That is, (e.g., radially) offsetting output mirror M3 causes a (e.g., radial) displacement of the position of the output image. In this manner, the diameter of the scanned FOV F1' can be expanded up to twice the length of the original (e.g., input) scan line A3. In the present case, the effective FOV of the scan is doubled. If mirror M3 is offset further, one may create an annular (e.g., donut-shape) scan pattern.

Figure 7:
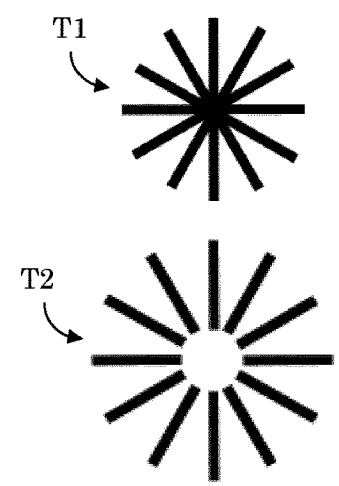
FIG. 7 illustrates two exemplary fixation target patterns T1 and T2 that may be created by appropriate offset adjustment of mirror M3 and rotation speed of K-mirror K1 of FIG. 6.

Optionally, the K-mirror-based scanning component may be used to provide a fixation target to a patient. For example, in the case of a visible light application, prior to actuating an imaging scan, a visible light line beam may be input to the K-mirror K1 to create a fixation target for a patient. FIG. 7 illustrates two exemplary fixation target patterns T1 and T2 that may be created by appropriate offset adjustment of mirror M3 and rotation speed of K-mirror K1. This may require that the K-mirror's rotation speed be controlled in accordance to human eye perception.

As a second example, the K-mirror may be used to provide fixation targets in a visual field tester. In this case, a patient is presented with a series of fixation points of various intensities and/or sizes at predefined locations within a visual field, and asked to identify the appearance, or absence, of the fixation points.

Alternatively, the K-mirror may be provided with multiple inputs to provide multiple light beam outputs, one of which may define a fixation target. FIG. 8 illustrates an implementation of a K-mirror module with two input light beams, B1 and B2. In the present case, mirrors M1 and M2 are made reflective to light beam B1 and transmissive (e.g., transparent) to light beam B2. In this manner, mirror M1 defines two separate inputs paths to the K-mirror. For example, mirrors M1 and M2 may have dichroic surfaces and be transmissive to light of a predefined frequency. In an exemplary operation, beam B1 may be rotated, or otherwise shifted, by the K-mirror, but beam B2 may pass through the K-mirror unabated. In the present example, light beams B1 and B2 may be visible (e.g., each selectively defines a respective fixation target), or one may be a scan beam while the other defines a fixation target.

FIG. 9 provides an alternate embodiment where mirror M3 is made reflective to first beam B1, and made transmissive to second beam B2 (e.g., visible light). In this manner, mirror M3 defines a second input path to the K-mirror. In the preset example, a fourth mirror M4 folds beam B2 from a fixation generator FG (e.g., second light source), to output through mirror M3 and define a fixation pattern for a patient.

FIG. 10 provides a third alternate embodiment where mirror M1 is made reflective on a first surface facing the interior of the K-mirror (e.g., reflective to B1), and thus functions as discussed above with reference to FIGS. 2-7, and made transmissive to light beam B2 on a second surface at the back side of the first. This second surface constitutes a second input to the K-mirror module, and may be used to provide a fixation input. For example, a fixation light source FG may input a fixation beam B2 (e.g., a line beam) to the K-mirror through the second input surface of mirror M1, and reflect off of mirrors M2 and M3 to produce an output fixation pattern (e.g., a rotating pattern as illustrated in FIG. 7) to a patient. This fixation pattern may be provided coincident with the application of an imaging scan (e.g., beam B1).

In all of the above embodiments, fixation light source FG may optionally be mechanically fixed to the K-mirror such that both move/rotate in tandem. In this manner, the fixation pattern may appear relatively static to a patient during application of an imaging scan.

FIGS. 11 and 12 illustrate two exemplary configurations for a fixation generator (second light source). In FIG. 11, fixation generator FG is shown to include a linear strip of light emitting diodes (LEDs) (exemplarily shown to include seven diodes D1 to D7), any combination of which may be selectively turned ON. In the illustrated example, diodes D1, D3, D5, and D7 are turned ON. If this pattern were submitted to a K-mirror for rotation, the resultant fixation pattern would be a series of concentric circles C1. Alternatively, as illustrated in FIG. 12, the fixation generator FG may include multiple diodes in a circular arrangement. In this configuration, a scan line beam may be transmitted within the center of the circular arrangement of diodes. In this case, it is not necessary that the fixation beam be rotated to create a circular pattern. Further alternatively, the fixation generator may include a two-dimensional array of diodes, not shown, and thereby define multiple different patterns. This configuration may be constructed by arranging multiple strips of diodes (such as shown in FIG. 11) adjacent each other.

The present K-mirror configuration may further be expanded to provide linear (or transverse) scans in place of, or in addition to, providing rotational scans. For example, an imaging system may selectively rotate and/or translate the K-mirror to switch between rotational and/or translational scanning operations.

Transverse Line Scanning with K-Mirror

In retina imaging, line scanning is typically done with a galvo mirror placed near a pupil conjugate. In a case where the space near a pupil conjugate is limited or not accessible, a scanning mechanism implemented near the retina conjugate would be preferable. This can avoid the need for an additional optical relay for creating another pupil conjugate.

Use of a prism for creation of a rotational beam is known, as is described for example in "Alignment of Rotational Prisms" by Donald L. Sullivan (*Applied Optics*, Vol. 11, No. 9, September 1972,) and in "Field Rotation and Polarization Properties of the Porro Prism" by Liu et al. (*J. Opt. Soc. Am. A*, Vol. 26, No. 5, May 2009). But its capability as a scanning mechanism has not been fully explored. U.S. Pat. No. 7,463,394 describes the use of a roof prism for scanning purposes, but appears limited to prisms with two mutually perpendicular reflecting surfaces. More importantly, as discussed above, a prism can generate undesirable aberration if the light passing through the prism is not collimated. Consequently, a prism is not suitable as a scanning component placed at, or near, a retina conjugate, where the beam of an ophthalmic imaging system is focused (non-collimated). An example of point rotational scanning using mirrors is described in "A Scanning System for Angle-Resolved Low-Coherence Interferometry", by Steelman (*Opt Lett.*, 2017 Nov. 15; 42(22): 4581-4584). However, as discussed by Sullivan, aligning a rotational scanning mechanism can be challenging. A transverse (or translational or one-dimensional) scanning mechanism would avoid some of these challenges and be easier to align. Thus, an option for transverse scanning mechanism may be preferred in some applications, if available. Herein is presented a scanning mechanism using a K-mirror to achieve a simplified transverse scanning mechanism.

Figure 13:
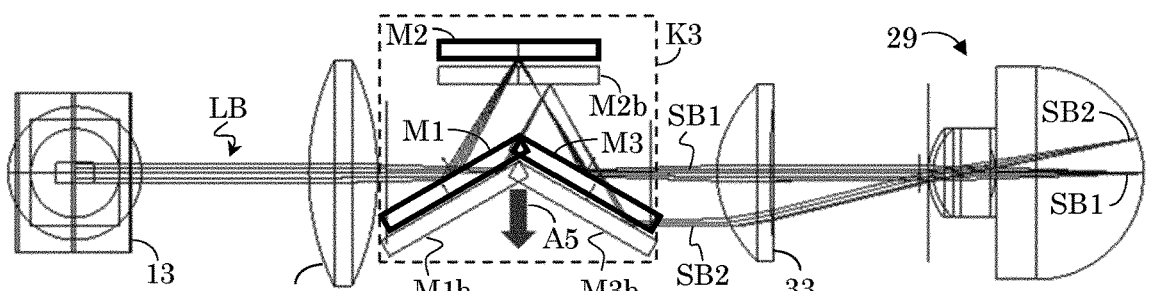
FIG. 13 illustrates a K-mirror module K3 translated along one dimension (along arrow A5) to achieve transverse scanning.

FIG. 13 illustrates a K-mirror module K3 translated along one dimension (along arrow A5) to achieve transverse scanning. In the present embodiment, K-mirror K3 is placed at, or close to, a retina conjugate between scan lens 31 and ocular lens 33. For illustration purposes light source 13 is shown providing an illumination line beam LB that passes through scan lens 31 (or optionally an objective lens), through a scanning component (e.g., K-mirror K3), traverses ocular lens 33 to scan the retina of eye 29, as indicated by displaced scan beams SB1 and SB2. For illustration purposes, mirrors M1, M2, and M3 are shown at a first position, and mirrors M1b, M2b and M3b are shown at a second, linearly displaced position along arrow A5. When the K-mirror K3 is at the first position indicated by mirrors M1, M2, and M3, line beam LB reflects from mirror M1 to mirror M2 and back to mirror M3 to define exit scan beam SB1. Similarly, when K-mirror is at the second position indicated by mirrors M1b, M2b, and M3b, line beam LB reflects from a second, offset position on mirror M1b to mirror M2b and back to mirror M3b to define exit scan beam SB2. By applying reciprocating motion to K-mirror K3, the line beam SB may be scanned along one dimension on the retina of the eye 29 to achieve 1D transverse scanning. This transverse scanning mechanism addresses the need for a scanner at the retina conjugate, and using mirror reflectors alleviates the undesirable aberration and dispersion characteristics of prisms. Additionally. the present transverse scanning mechanism may be easier to align than a rotational scanning mechanism.

Figure 14A:
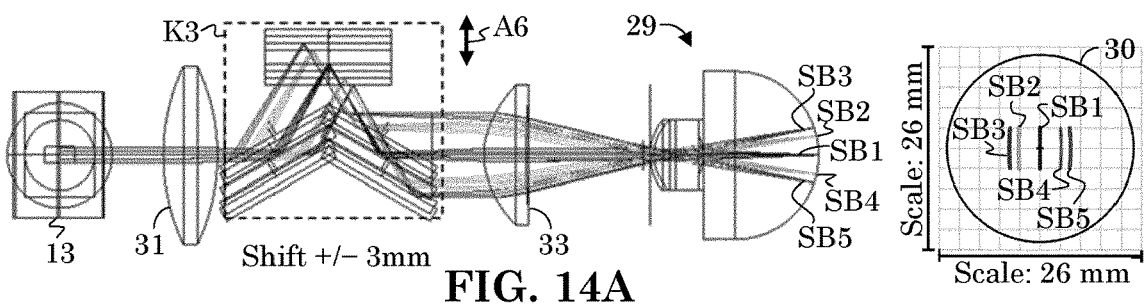
FIGS. 14A and 14B show a more detailed Zemax™ simulation of using a K-mirror K3 linearly translated along arrow A6 for transverse line scanning.
Figure 14B:
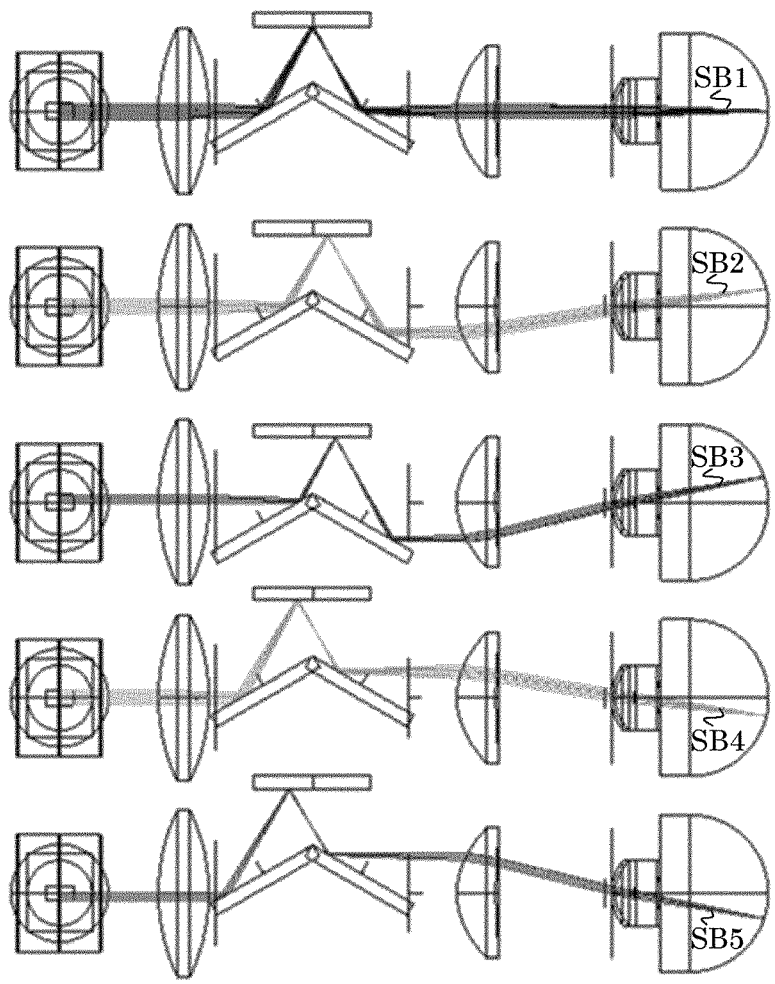

FIGS. 14A and 14B show a more detailed Zemax™ simulation of using a K-mirror K3 (linearly translated along arrow A6) for transverse line scanning. FIG. 14A shows using a line-field system (e.g., a line beam) as an example. Shifting the K-mirror K3 at a retina conjugate plane by +/−mm scans the line illumination across 8 mm horizontally at the retina, as illustrated by scan beams SB1 to SB5. Frontal, planar view 30 of the scanned retina shows the five line-scan beams SB1-SB5 at different scanning positions, as produced by (linear) translational motion of the K-mirror. For ease of illustration, FIG. 14B shows the five, individual transverse/shift positions of the K-mirror that define the five scan beams SB1, SB2, SB3, SB4, and SB5 at five distinct scanning positions on the retina.

Using mirror reflectors, or reflective surfaces, as in K-mirror K3, eliminates the undesirable aberration that would be introduced to the un-collimated light beam by a prism. Being free from aberration makes this approach preferable as a scanning mechanism at the retina conjugate, where the beam is typically not collimated. A scanner near a retina conjugate can be useful when access to a pupil conjugate plane is limited or not available. The present embodiment also shows that a roof structure, such as described in U.S. Pat. No. 7,463,394, is not necessary for generating a beam displacement for transverse scanning, as the K-mirror proposed here does not have a roof structure. Another benefit of the present embodiment is that transverse scanning is generally simpler in alignment as compared to rotational scanning.

Other mirror assemblies with multiple reflection surfaces for transverse scanning may be possible. Generally, an odd number of reflections through a mirror system can displace a beam along its same direction, and an even number of reflections can displace a beam along its reverse direction. A lateral shift of a mirror module by a first amount, can result in a multiplicative lateral displacement/shift/scan (e.g., double or more) of the output scan beam by a second amount.

While translating a K-mirror results in transverse scanning in one corresponding dimension, it is possible to combine multiple K-mirrors to scan in more than one dimension. For example, combining two K-mirrors with perpendicular scanning axes can achieve a two-dimensional scanning. However, the scanning speed of this construct may be limited by speed limitations associated with translating a mirror assembly.

Figure 15:
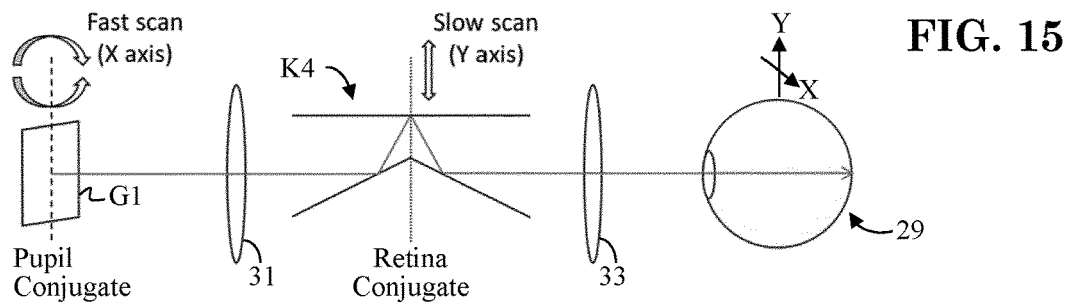
FIG. 15 illustrates a two-part, scanning mechanism with a first part positioned at a pupil conjugate and a second part positioned at a retina conjugate.

K-mirror transverse scanning can also be combined with other scanning methods. For example, FIG. 15 illustrates a two-part, scanning mechanism with a first part positioned at a pupil conjugate and a second part positioned at a retina conjugate. In the present embodiment, a K-mirror K4 placed at, or near, a retinal conjugate, and is used for slow-axis scanning. A galvo scanner G1 is placed near the pupil conjugate, and is used for fast-axis scanning. For example, in the case of two-dimensional point scanning where a scan point is scanned horizontally to define a row of scan points and is then shifted vertically to a new row position, horizontal scanning would be fast-axis scanning, and vertical scanning would be slow-axis scanning. In this embodiment, two scanners are separated (K4 and G1) in space for ease of system integration. This embodiment also permits the scanning pivoting point (or galvo G1) to be substantially at the pupil conjugate, which is difficult to achieve if two galvo scanners need to at one pupil conjugate, as illustrated, for example, in FIG. 1.

Figure 16A:
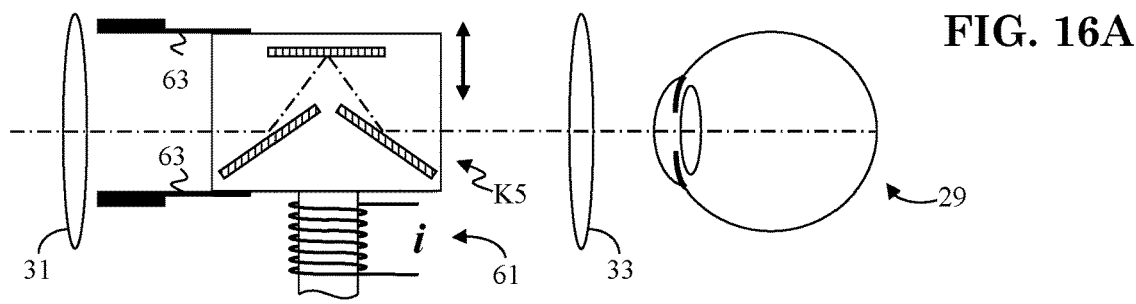
FIGS. 16A and 16B illustrate a first K-mirror translating mechanism using an inductive actuator.
Figure 16B:
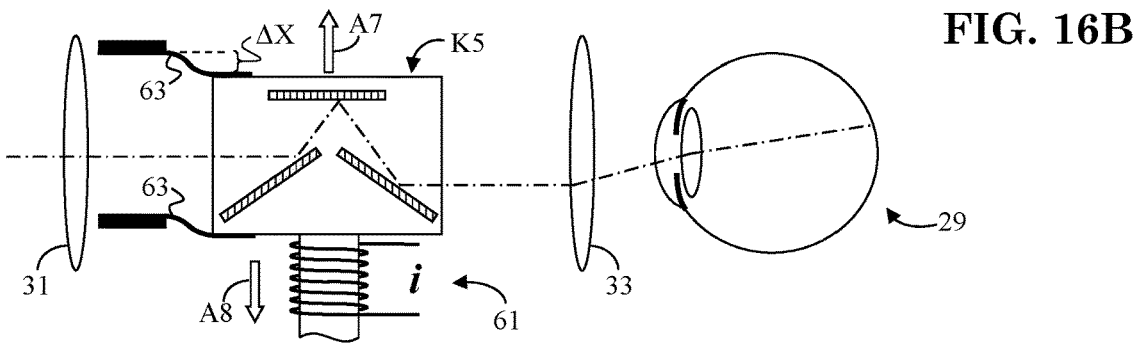

Multiple, different translating mechanisms for a K-mirror are suitable for the present invention. FIGS. 16A and 16B illustrate a first K-mirror translating mechanism using an inductive actuator 61.

In the present approach, inductive actuator 61 is combined with a parallel flexure (e.g., isotropic spring) 63, each providing an opposing force indicated by arrows A7 and A8. As is shown in FIG. 16B, when inductive actuator 61 is actuated/activated, such as by application of an appropriate electric current i, a force is created that causes support bar 62 (and attached K-mirror K5) to move and create a proportional translational offset Δx. Conversely, when inductive actuator 61 is not actuated, or its applied current i is reduced, the spring force of parallel flexure 63 moves K-mirror K5 in an opposite direction to eliminate, or reduce, the offset Δx. Inductive actuator 61 would provide quieter operation as compared to a mechanical actuator. Parallel flexure 63 allows for a compact, in-line setup. Also, the displacement is a function of electric current, Δx=f(i), and can therefore eliminates the need of an encoder. This is because inductive actuator 61 exerts force $F_i$ that is a function of the electric current i, $F_i(i)$, working with a spring exerting a force $F_k$ proportional to the displacement Δx, e.g., $F_k(\Delta x)=k\Delta x$, where k is the spring constant. In equilibrium, $F_i(i)=F_k(\Delta x)=k\Delta x$, so the displacement ($\Delta x=F_i(i)/k$) is thus a function of the electric current i.

Figure 17:
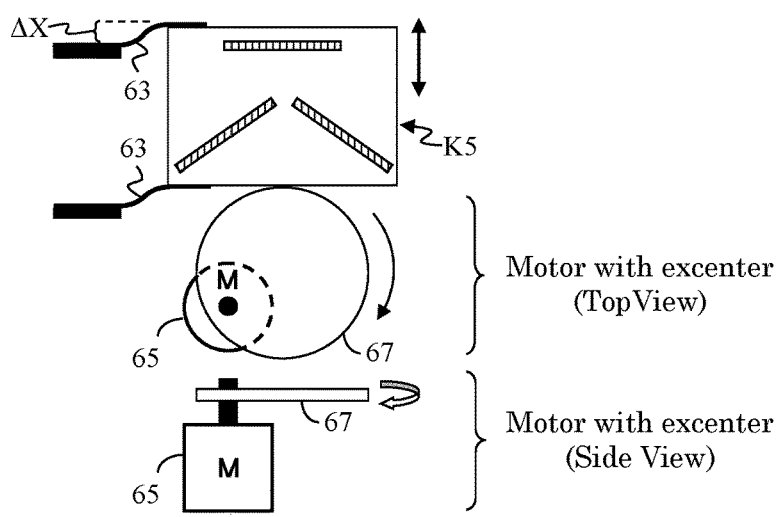
FIG. 17 illustrates an alternate translating mechanism that uses a motor with excenter (e.g., off-center wheel/disk) to move a K-mirror and thereby deform a parallel flexure by a given offset Δx.

FIG. 17 illustrates an alternate translating mechanism that uses a motor 65 with excenter (e.g., off-center wheel/disk 67) to move a K-mirror K5, and thereby deform the parallel flexure 63 by a given offset Δx. An object (e.g., wheel or disk 67) rotated by the motor 65 is asymmetric to the rotational center so its rotation can cause translation of the adjacent parallel flexure 63, such as by pushing on K-mirror K5. The object 67 rotated by the motor 65 need not to be a disk. An arbitrary shape can be designed (e.g. a waterdrop shape) to provide a desired scan speed and/or pattern.

As is explained above, since the present invention permits the scanning component (e.g., K-mirror) to be positioned at the retina conjugate, it cannot be used for a pupil splitting function. Therefore, the present invention proposes that a stationary beam splitter of special size and shape be positioned at the pupil conjugate and be used to provide pupil splitting functionality. Positioning of the beam splitter at a pupil conjugate for implementing a pupil splitting function is facilitated due to the beam splitter being stationary, which further simplifies assembly of the ophthalmic imaging system. As will be discussed more fully below, this configuration provides additional benefits for interferometry applications, such as OCT/OCTA.

Beam Splitter Design for Efficient Interferometry

For ease of discussion, the present embodiments are described as applied to an OCT system, but it is to be understood that similar pupil splitting functionality may be applied to a fundus imager or OCTA system. Also for ease of discussion, the present embodiments focus on the relevant components, as discussed above in reference to the OCT example of FIG. 1, but configured for specific field configurations such as line-field or full-field imaging. Embodiments for line-field imaging are addressed first, followed by a discussion of benefits of the present invention as applied to full-field imaging. It is be understood that the present invention may be applied to other light field configurations.

Figure 18:
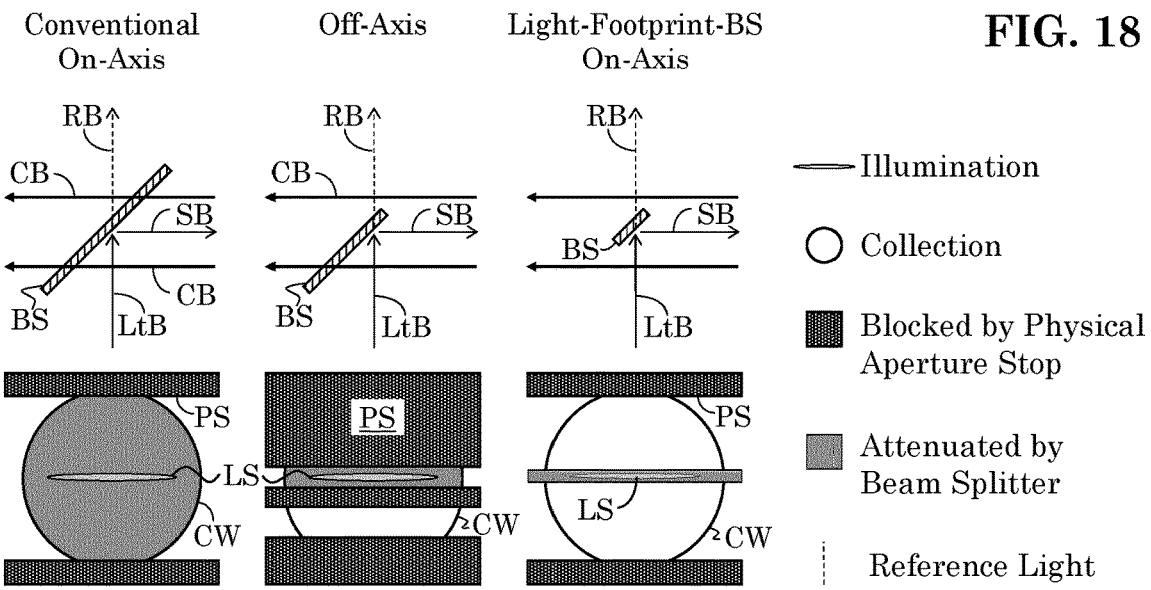
FIG. 18 illustrates three beam splitter (SB) configurations as may be used with a line-field ophthalmic imaging system.

FIG. 18 illustrates three beam splitter configurations as may be used with a line-field ophthalmic imaging system. It is to be understood that a similar configuration may be used with a full-field ophthalmic imaging system. The first beam splitter configuration may be termed a "Conventional On-Axis" configuration and centers the beam splitter BS on the illumination/collection optical axis to a sample (e.g., an eye) and spans the entire optical path of the illumination (light) signal/beam LtB (herein illustrated as a scan line SL) to the eye and the entire collection signal/beam CB from the sample. Sample beam SB points toward the sample being imaged (e.g., the sample arm of the system), e.g., an eye under test. The FOV of the collection beam (e.g., from the point of view of a collector) is here illustrated as a circular collection window CW. Since the entirety of the collection signal CB passes through the beam splitter BS on its way to a collector in the present Convention On-Axis configuration, collection window CW is shown fully darken to illustrate that the entirety of the collection beam CB is attenuated by the beam splitter BS on its way to the collector. For completeness, a system pupil stop PS, e.g., physical aperture stop, is also shown. Pupil stop PS may be placed at pupil conjugate of the eye being imaged. In the present case, the pupil stop PS may help to define the collection window CW.

The second configuration may be termed an "Off-Axis" configuration, and displaces the beam splitter BS off of the illumination/collection optical axis such that it spans only a fraction (e.g., about half) of the optical path of the returning collection beam CB. In this configuration, a portion of collection window CW is shown darken corresponding to the portion of the collection beam CB that passes through the beam splitter SB, and the remainder of the collection window CW is shown white to highlight the portion of collection beam CB that passes the plane of the beam splitter BS, but does not pass through the beam splitter and is therefore not attenuated by the beam splitter BS. In this case, the focus of the line scan LS (e.g., illumination beam LtB) is shown within the darken portion of the collection window.

The third configuration is herein termed "Light-Footprint-BS On-Axis" and uses a beam splitter BS whose shape conforms to the light footprint of the illumination beam LtB. In the present line field example, the beam splitter BS of the Light-Footprint-BS On-Axis configuration may be shaped as an elongated slit (or rectangle) whose area (or dimensions) conform to, and may be slightly bigger than, the light footprint of the incident illumination light LtB. In this case, collection window CW is shown mostly white since most of the collection beam passes unabated above and below the beam splitter BS. Only the central region of collection window CW, corresponding to the position of the beam splitter BS at the focus of the line scan LS (e.g., illumination beam LtB) is shown darken.

In a line-field OCT using the Conventional On-Axis configuration, the beam splitter (BS) in the interferometer is typically a plate or cube beam splitter with a uniform beam splitting ratio across the entire optical surface, as discussed above in reference to FIG. 1. In this typical implementation, the beam splitter guides a limited amount of sample light SB toward the sample (e.g., eye fundus) and attenuates the back-scattered light signal CB from the sample, and thus limits the detection sensitivity. For example, in the Conventional On-Axis configuration, the illumination beam LtB passes through the beam splitter BS twice (once when it is divided into the reference beam RB and sample beam SB, and again when the collection beam CB returns from the sample). For a 50/50 beam splitter, this means that 75% of the illumination light LtB is lost (50% for each pass). This power inefficiency is undesirable, especially when the source power and the allowed optical power to the eye are limited. A method to efficiently guide the probe light (e.g., sample light SB) toward the sample and to efficiently collect back-scattered light CB returning from the sample is needed.

Previous efficiency improvements have been proposed. A polarization-based approach is described in U.S. Pat. Nos. 7,145,661 and 9,778,020, assigned to the same assignee as the present application. This approach uses a polarization BS and a polarization rotator in a probe beam path as a non-reciprocal beam divider, so that the back-scattered light's polarization is rotated and can efficiently pass through the polarization beam splitter. However, the sample's birefringence may have already changed the polarization state of the back-scattering light and thus reduce the efficiency. Also, polarization optics are typically of higher cost and not suitable for a low-cost device. An off-axis detection method is described in co-owned U.S. Pat. Appl. 2018/0259316, in which a beam splitter is positioned to partially cover the collection pupil, allowing for more efficient guiding of probe light and higher throughput of signal light. However, this approach still blocks a large portion of the collection pupil and the signal light. Furthermore, since the beam splitter is at a collection pupil conjugate of a photosensor or camera, it cannot provide (eye) pupil splitting functionality. Another approach, described for example in U.S. Pat. Nos. 7,648,242 and 6,758,564), uses an aperture mirror/beam splitter in a line-scan scanning laser ophthalmoscope (SLO), but to date, any advantages of an aperture beam splitter have not been fully realized for interferometry. Another approach is to replace the above-described free-space beam splitter configuration in favor of specialized fiber couplers. For example, fiber-based optical circulator implementations have been described in association with point-scanning (e.g., point-field) OCT, such as described in U.S. Pat. No. 7,362,444B2, but this approach is not applicable to line-field OCT and increases cost.

In the present approach, the Off-Axis configuration permits a portion of the back-scatter collection light CB to pass through the same plane (e.g. the same (eye) pupil conjugate plane) as the beam splitter but avoid passing through the beam splitter. Additionally, a physical aperture stop (or pupil stop) PS may be positioned at another (eye) pupil conjugate plane and configured to help define (eye) pupil splitting regions. Use of the physical aperture in combination with the beam splitter may provide pupil splitting functionality. Additionally, as is discussed below, the shape of the pupil stop may be selected in accord with specific imaging needs, such as for higher axial depth resolution and/or for light intensity and transverse resolution. In the present example, the pupil stop PS is shaped to block most of the area of the beam splitter.

In a line-field OCT system, an illumination beam LtB is focused (non-collimated) in one dimension/orientation of the beam splitter (e.g. along the width dimension of line scan LS) and left non-collimated in the orthogonal dimension (e.g. along the length dimension of line scan LS). This illumination forms mutually perpendicular lines at the pupil and at the object planes respectively in the system. In the Light-Footprint-BS On-Axis configuration, the beam splitter BS may be a slit beam splitter (slit-BS) that has an optical surface that is narrow in the dimension in which the illumination beam LtB is focused, and can be as narrow as a few times (e.g., 10 times) the beam width, as determined by the mechanical/operational tolerances of the system. The slit beam splitter may also have an optical surface that is wider in the dimension along the scan line. Again, the beam splitter may be placed at, or close to, a (eye) pupil conjugate plane. This slit beam splitter may also have a high reflection-transmission ratio (e.g., 10/90) to guide most of the source light LtB toward the sample and a high throughput for the collection signal light CB without (or with minimal) blockage or attenuation by the slit beam splitter. A 10/90 reflection-transmission ratio means that a light signal beam is attenuated by 90% each time it passes through the beam splitter, and thus would typically not be suitable for the conventional on-axis method since this would greatly diminish the collection signal CB returning from the sample. In the present Light-Footprint-BS On-Axis configuration, however, a high reflection-transmission ratio is possible since most the returning collection signal light CB does not pass through the slit-BS and is thus not subjected to its 90% attenuation. As compared to a Conventional On-Axis design with a 50/50 beam splitting ratio, the present slit beam splitter can provide about 6 dB of sensitivity improvement. Also as compared to other designs, the slit beam splitter (of the Light-Footprint-BS On-Axis configuration) is a reciprocal component that efficiently guides only the necessary light in every aspect (illumination, collection, reference) in a line-field interferometry.

Advantageously, the present ophthalmic imaging system may be configured to switch between the Off-Axis configuration and the Light-Footprint-BS On-Axis configuration. That is, by varying the pupil stop PS, the instrument may switch between on-axis and off-axis operations without changing the optics. Because both modes have their own advantages, this flexibility enables the device for a wide range of applications. The slit beam splitter blocks the low spatial frequency signal light and allows for a clear separation of the background and illumination signal.

This feature can be useful in a system where the source spectrum is fluctuating, such as a pulse-tuned diode laser. The low spatial frequency block can also reject the corneal reflection. The on-axis design is easier to implement as compared to off-axis methods, and the slit BS is of lower-cost as compared to polarization-based methods. In addition, the slit beam splitter allows for a line-scan Scanning laser ophthalmoscopy (SLO) with the same setup, which cannot be achieved by a hole in a mirror.

Figure 19:
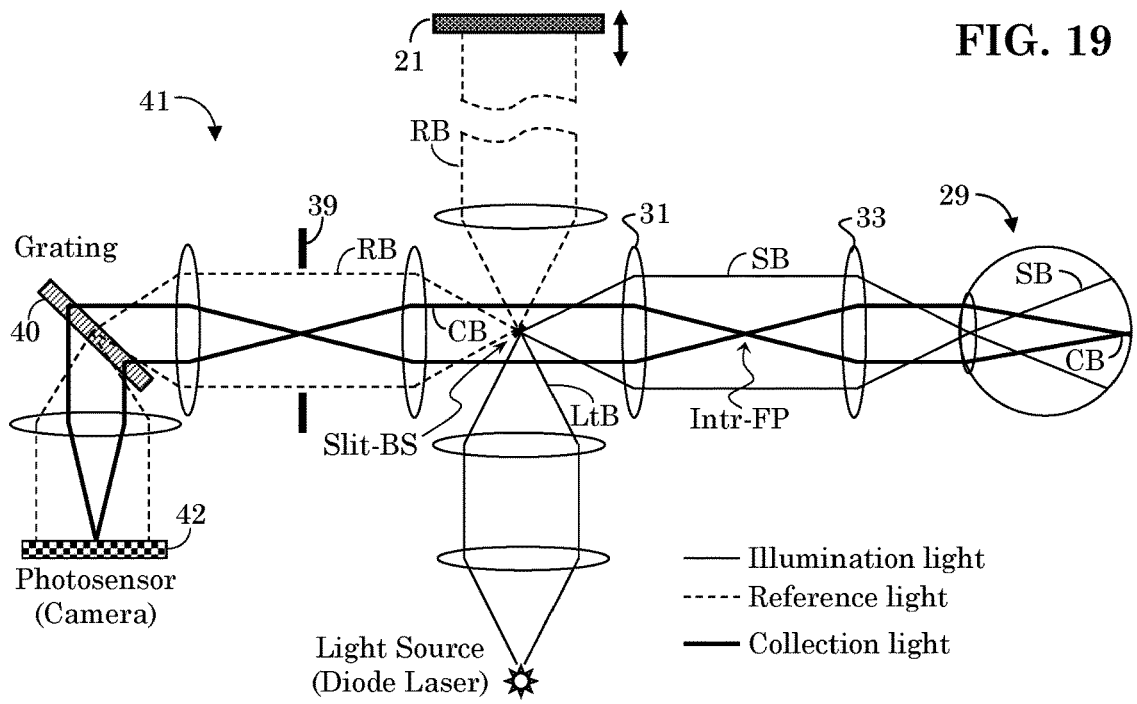
FIG. 19 illustrates a simplified schematic of a Slit-BS On-Axis configuration in a line-field SDOCT system.

FIG. 19 illustrates a simplified schematic of the Light-Footprint-BS On-Axis configuration in a line-field SDOCT system. The slit beam splitter (Slit-BS) is placed at or close to a pupil conjugate plane. Note that the Light-Footprint-BS On-Axis design allows efficient guiding of the illumination (sample) beam SB and minimal attenuation, or blockage, of the collection beam CB. As discussed above, the collection beam CB and returning reference beam RB pass through aperture 39 to collector 41, which may be comprised of a spectrometer. Diffraction grating 40 separates incoming light into different frequency components, and photosensor 42 captures the resultant spectrum.

Figure 20:
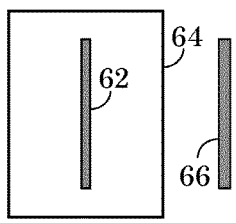
FIG. 20 illustrates a first construction of a light footprint BS suitable for a line field application.

FIG. 20 illustrates a first construction of a light footprint beam splitter suitable for a line field application. For manufacturing, the slit BS may be a slit-like coating 62 on a larger substrate 64. For example, the slit BS may consist of a slit-like coating on a thin glass substrate 66. Alternatively, the slit BS may be a thin stripe 66 of substrate that is uniformly coated. The substrate may be a plate or a prism, and the coating surface may be sandwiched between two substrates.

Figure 21:
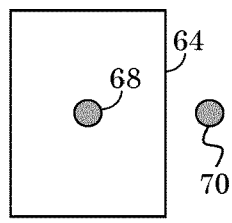
FIG. 21 illustrates a second construction of a light footprint BS suitable for use with a full-field or partial-field application where the illumination light is focused to a point, or small 2D region.

FIG. 21 illustrates a second construction of a light footprint BS suitable for use with a full-field or partial-field application where the illumination light is focused onto a point or dot or small 2D region. In this case, a dot-like (e.g., circular) beam splitter 68 of size determined by the illumination light footprint may be used. The dot beam splitter 68 may be coated on the larger substrate 64 or may be a circular shaped piece of substrate 70 that is uniformly coated. The dot-like beam splitter 68 would be a small area in two dimensions at a pupil conjugate plane.

Figure 22:
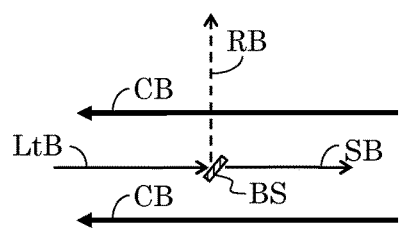
FIG. 22 illustrates an alternate construct for the present beam splitter where, instead of comprising a small-area coating on a transparent substrate, the beam splitter is constructed as a coating on an all-reflective substrate where the illumination light LtB passes through the beam splitter to define a sample beam SB along the sample arm, and the reference beam RB is reflected off of the beam splitter to the reference arm.

FIG. 22 illustrates an alternate construct for the present beam splitter where, instead of comprising a small-area coating on a transparent substrate (e.g., thin glass substrate 64), the beam splitter is constructed as a coating on an all reflective substrate where the illumination light LtB passes through the beam splitter to define the sample beam SB on the sample arm, and is folded by the beam splitter to define the reference beam RB on the reference arm.

Similar benefits of efficient illumination and collection as well as spatial frequency analysis would apply to all these beam splitter configurations.

Figure 23:
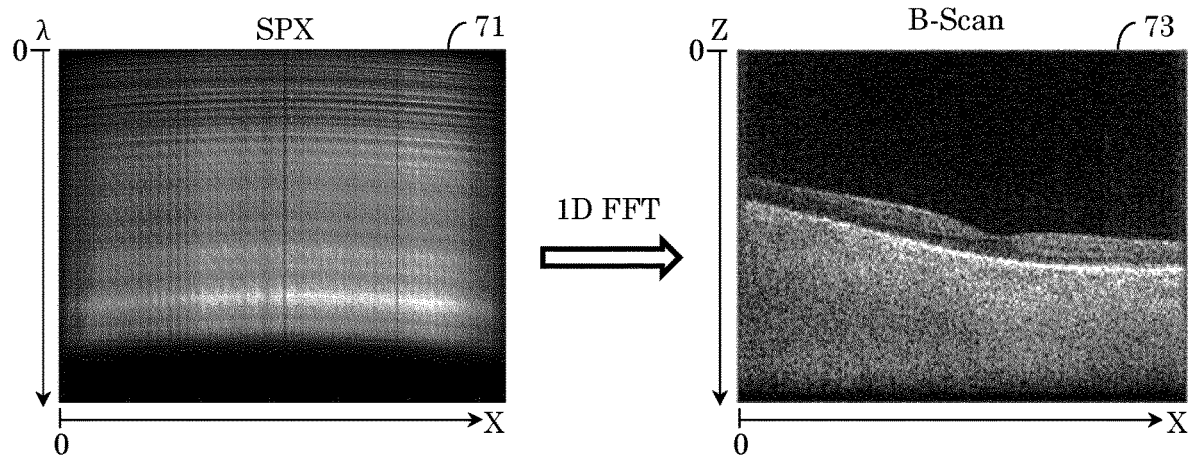
FIG. 23 illustrates a spectrum 71, as may be obtained using the present Light-Footprint-BS On-Axis method, and a resultant representative retina image 73, as may be constructed by applying a 1D FFT to spectrum 71.
Figure 24:
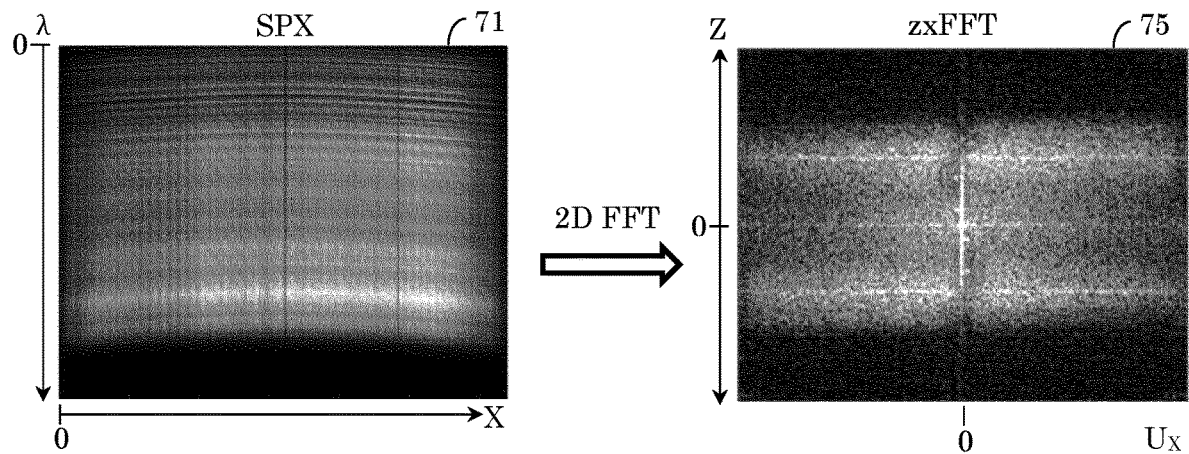
FIG. 24 shows the same spectrum 71 of FIG. 23, but with collection pupil, spatial-frequency-analysis image 75 constructed by applying a 2D FFT.

Typically, one would apply a 1D FFT to spectrum (e.g., as captured by photosensor 42) to recover depth information at the retina of the eye. However, by first applying a 2D FFT to the captured spectrum, one may recover a spatial spectral distribution at the pupil conjugate. For example, FIG. 23 illustrates a spectrum 71, as may be obtained using the Light-Footprint-BS On-Axis approach, and a resultant representative retina 73, as may be constructed by applying a 1D FFT to spectrum 71. FIG. 24 shows the same spectrum 71, but applying a 2D FFT results in spatial frequency image 75.

Figure 25:
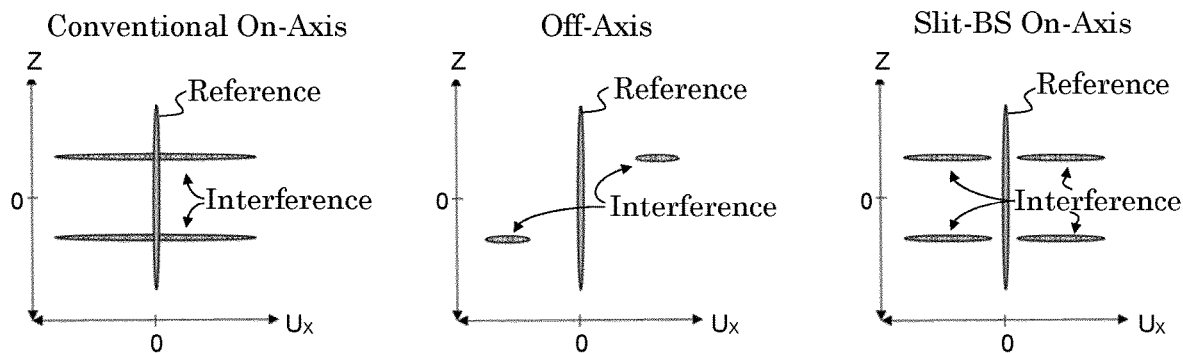
FIG. 25 illustrates a 2D FFT analysis of a spectrum captured for the Conventional On-Axis configuration, the Off-Axis configuration, and the Light-Footprint-BS On-Axis configuration.

FIG. 25 illustrates a 2D FFT analysis of a spectrum captured for the Conventional On-Axis, Off-Axis, and Light-Footprint-BS On-Axis configurations. Each analysis shows the recovered reference signal, and two interference signals, one above the zero z-axis reference and another below. One of these interference signals, e.g. the one above the zero z-axis, may be the true interference signal and the other (e.g. the interference signal below the zero z-axis) may correspond to a complex conjugate of the true interference signal. In the case of the Conventional On-Axis design, the reference and interference signals overlap each other, and are therefore difficult to separate. By comparison, the 2D FFT of the acquired signal from the Off-Axis and Light-Footprint-BS On-Axis configurations show a clean separation of the reference signal at low spatial frequency (e.g., close to the zero $U_x$ value) and interference signal at higher spatial frequency. This enables direct retrieval of the reference spectrum from the interferogram, and is of particular interest for a light source with fluctuating spectrum, such as pulse-tuned diode laser. In comparison to the Conventional On-Axis method, the Off-Axis method not only collects more light with a higher transverse resolution, but also acquires full spatial frequency content allowing full phase analysis/correction along one dimension. For example, one could mask out the spectrum below the zero $U_x$ value and analyze along Z-dimension in the spectrum portion above zero $U_x$ resulting in a full-range (e.g., higher depth resolution) without obstruction from a complex conjugate component. However, the full range capability and the sensitivity advantage for imaging close to zero delay may be reduced, or lost. The Light-Footprint-BS On-Axis design may provide higher imaging sensitivity (including close to zero delay), and can be easily converted to off-axis operation by implementing a different aperture stop PS at a pupil conjugate plane. This flexibility enables the system to work in different modes for different applications. For high sensitivity and transverse resolution applications when depth range is not critical, such as retina and skin imaging, the instrument can operate in Light-Footprint-BS On-Axis mode. For long depth range applications when sensitivity and transverse resolution can be compromised, such as anterior segment (eye) imaging, the instrument can operate in off-axis mode. For example, in the illustrated Off-Axis spectra, the full range of the depth, as shown along the z-axis, can be obtained from the interference signal at one side of the reference signal without overlap between the true interference signal and its complex conjugate such that a larger axial resolution may be achieved. This opens up the possibilities for different applications with a versatile OCT device.

Figure 26:
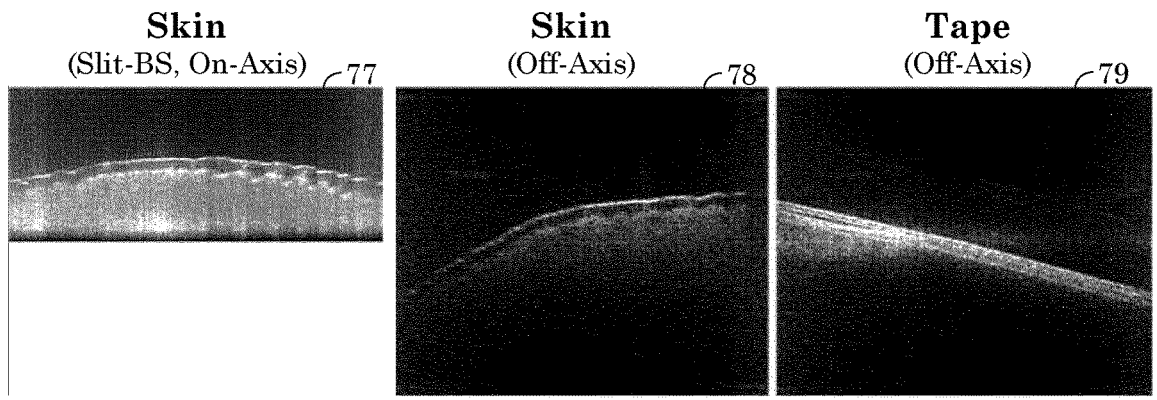
FIG. 26 illustrates three sample OCT images taken with both Light-Footprint-BS On-Axis and Off-Axis configurations/modes.

The ophthalmic imaging system may be easily switched between on-axis mode for higher sensitivity and off-axis modes for deeper resolution by introducing a variable (system) stop at a pupil conjugate. For example, FIG. 26 illustrates three sample OCT images taken with both Light-Footprint-BS On-Axis and Off-Axis modes. Image 77 illustrates the use of the slit-BS with on-axis mode on skin and image 78 illustrates the use of the slit-BS with off-axis mode on skin. As shown, image 78 achieves higher depth resolution, but with reduced light and lower transverse resolution. For a highly scattering sample like skin, the Light-Footprint-BS On-Axis mode (image 77), may be preferred over the Off-Axis mode to achieve a higher sensitivity because of the limited penetration depth allowed by the tissue. However, for a more transparent sample, like tape or the anterior segment of an eye, the Off-Axis mode provides longer depth range, as illustrated by image 79.

Figure 27:
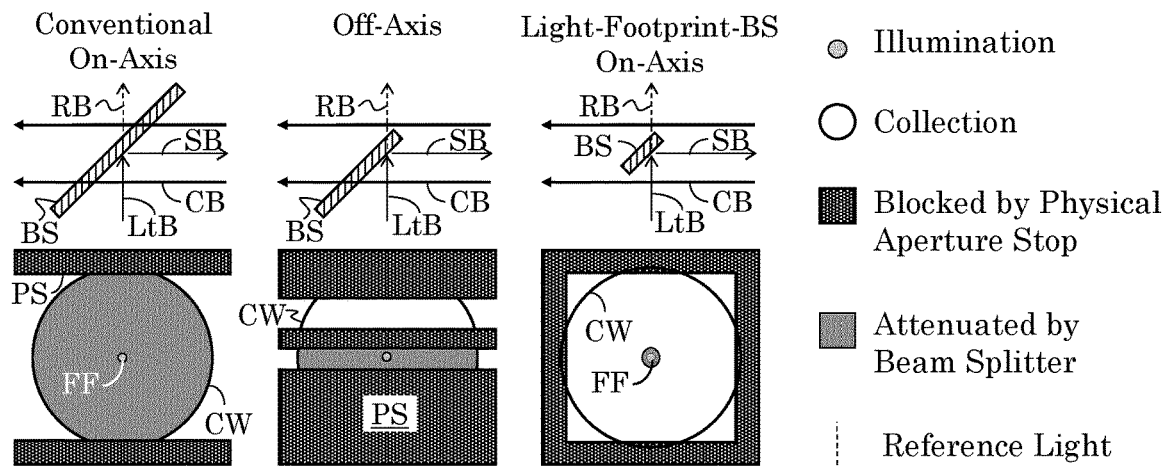
FIG. 27 illustrates exemplary beam splitting scenarios and the illumination/detection pupils for full-field or partial field interferometry.

FIG. 27 illustrates exemplary beam splitting scenarios and the illumination/detection pupils for full-field or partial field interferometry. In the present case, the light-footprint-BS is implemented as a dot beam splitter of size determined by the full field (FF) focal point area (e.g., light footprint) of the illumination signal LtB. All elements similar to those of FIG. 18 have similar reference characters and are describe above.

Figure 28:
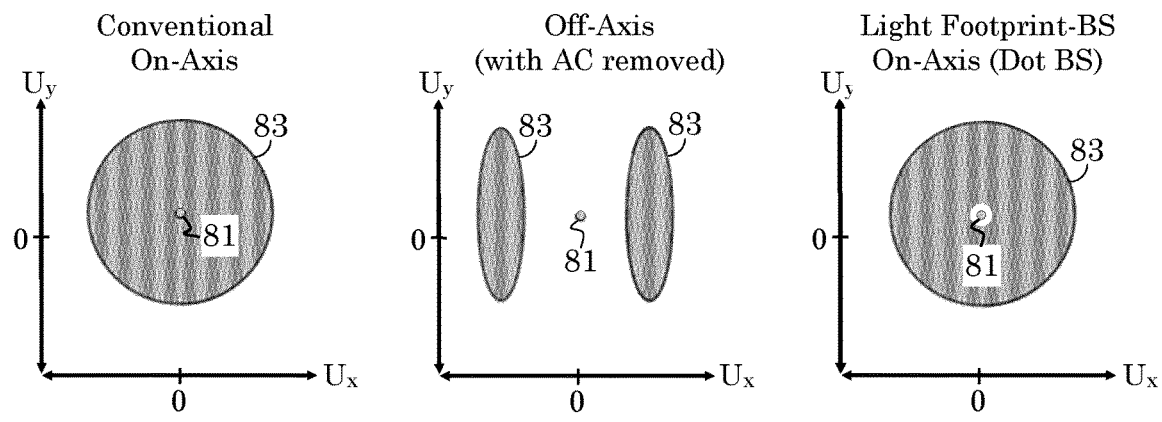
FIG. 28 illustrates an exemplary detected signal in the 2D spatial frequency domain (such as obtained by applying 2D FFT) for each of the three scenarios of FIG. 27.

FIG. 28 illustrates an exemplary detected signal in the 2D spatial frequency domain (such as obtained by applying 2D FFT) for each of the three scenarios of FIG. 27. As before, the reference signal 81 and interference signal 83 of the conventional On-Axis mode overlap each other, but they are separated in the On-Axis mode and in the Light-Footprint-BS On-Axis mode.

To recapitulate, in the above described embodiments, the beam splitter BS is placed at the pupil conjugate of a line-field OCT system for efficient illumination and signal collection. A variable, or switchable, system pupil stop may be placed at a (e.g., another) pupil conjugate for switching between on-axis and off-axis modes, or for selecting the size/shape of a collection pupil. As discussed above, the present construct may use the beam splitter for pupil splitting of the sample beam and collection beam. The present embodiments also permit the low spatial frequency components of the reference signal read out by the photosensor/camera to be separated from the interferometric signal. The reference signal may then be used as background signal in OCT processing. The use of 2D FFT provides a spatial spectral distribution at the pupil conjugate, and permit selection of interference signal excluding any complex conjugate components. Also, the present slit BS design allows integration of line-field OCT and line-scan SLO using the same setup.

It was further noted that taking 2D FFT of the captured spectrum provides a 2D spatial frequency distribution at the pupil conjugate, e.g., at the pupil of a patient's eye. This leads to the use of the spatial frequency analysis for aligning an ophthalmic imaging system to a patient's eye prior to capturing an image.

Spatial Frequency Analysis in OCT for Pupil Alignment

Proper alignment of an ophthalmic imaging system/device to a patient's eye is a crucial step in image acquisition, which may affect image quality and information derived from the captured image. Unfortunately, obtaining proper alignment can be a complicated process requiring additional imaging components and much technician interaction. In ophthalmologic OCT instruments, iris cameras (or other alignment-assisting setups/mechanisms) are typically required for imaging the posterior of a patient's eye as part of a process to align the patient's pupil to the instrument. This requirement complicates the system and increases its cost. A simple and cost-effective approach to achieve pupil alignment is thus desirable, especially when an objective is a compact and low-cost OCT device.

The spatial frequency in the OCT interference is due to the offset of the back-scattered light and the reference light at the pupil conjugate. By analyzing the spatial frequency content (e.g., two-dimensional FFT of the interference in a line-field SD-OCT system), the spatial distribution of the back-scattered signal within the system's collection pupil can be inferred. This information is built-in to (integral to) the OCT data, and can be extracted for patient alignment of the OCT device, thus simplifying the setup of the OCT device and lowering its cost.

Research in spatial frequency analysis in OCT has opened up possibilities in eye imaging in recent years. The spatial frequency contents of a full-field (FF) en face OCT image has been used for digital aberration correction, see for example, "Numerical focusing methods for full field OCT: a comparison based on a common signal," by Kumar et al., *Opt. Express*, V22, No. 13, 16061-16078, 2014. However, the use of spatial frequency analysis (e.g., 2D or 3D FFT) in OCT for patient pupil alignment has not been fully explored. It is herein put forth that this approach provides a straight-forward solution to the patient pupil alignment problem.

In the present method, the spatial frequency in the OCT interference signal (e.g., 2D FFT of the interference in a volumetric LF-SDOCT system) is used as a cue for the patient's pupil alignment that may be used, for example, as part of a fully automated or semi-automated pupil alignment subsystem, or system that provides alignment instructions, suggestions, or identifies possible sources of alignment error to a system operator. The spatial frequency content may be generated from the offset of the back-scattered signal and the reference light at the pupil conjugate. The spatial frequency content can be visualized and analyzed in the FFT space, and the patient's pupil alignment relative to the instrument's pupil can be inferred within the FFT space. For example, in a line scanning OCT system, alignment information in the dimension parallel to the line illumination on the retina may be inferred from the spatial frequency content along that dimension.

Figure 29:
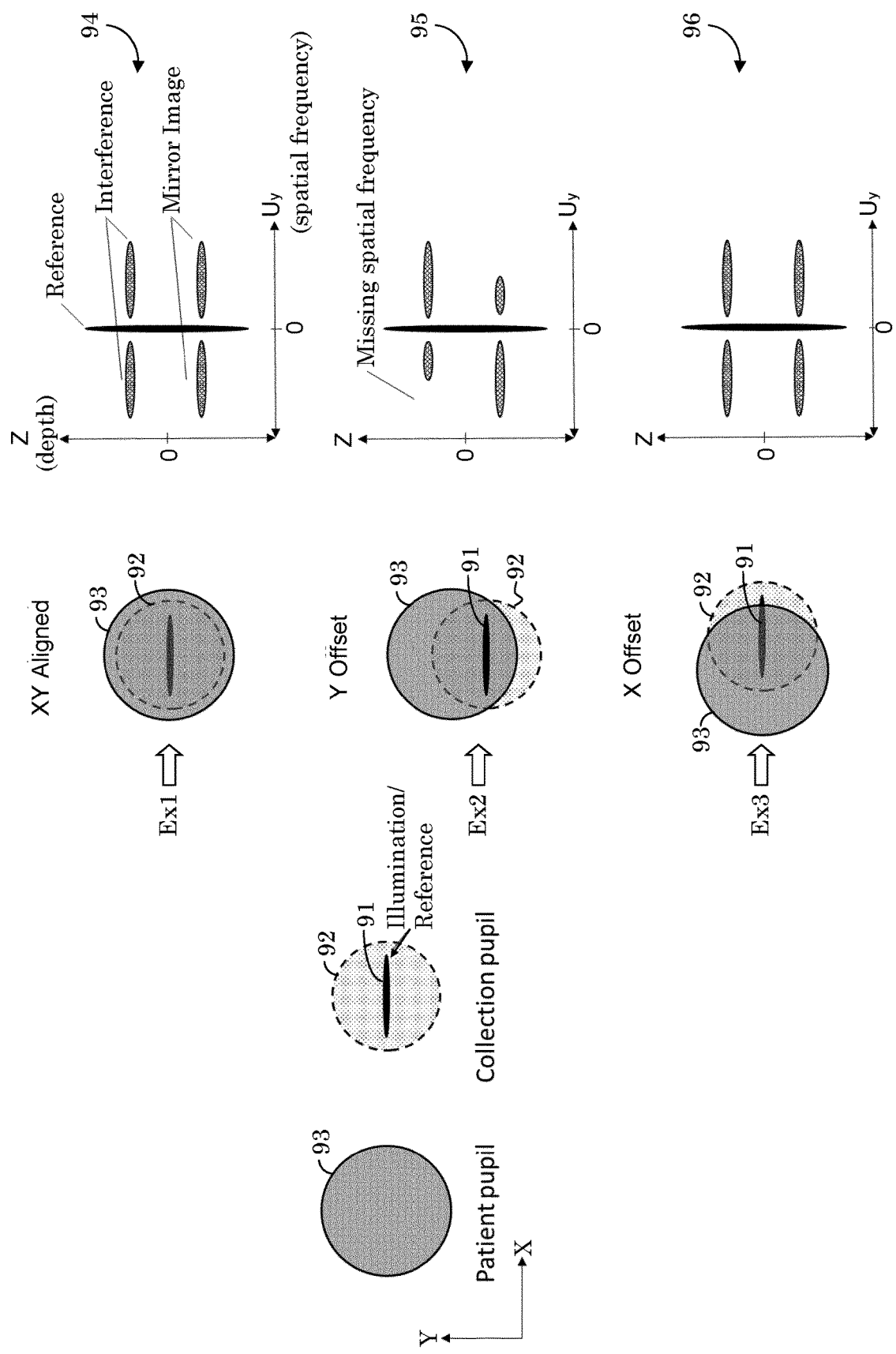
FIG. 29 illustrates a spatial frequency analysis for pupil alignment in an LF-SDOCT system.

For illustration purposes, an example of the present invention implementing the above-discussed, Light-Footprint-BS On-Axis method in a line field (LF)-SDOCT system is provided. It is to be understood that the present invention may be implemented with other types of OCT systems, such as full-field, partial field, and spiral scanning OCT systems. FIG. 29 illustrates a spatial frequency analysis for pupil alignment in the present, exemplary LF-SDOCT system. In this embodiment, the illumination beam/signal forms a line beam 91 at the pupil plane (note that a corresponding [e.g., generally orthogonal] line beam is also formed at the retina plane, e.g., forms a line illumination on the retina, not shown), and the instrument's collection pupil 92 may be a circular area (or other shaped area) centered around the illumination line beam 91. As is further illustrated in FIG. 29, from the photosensor's point of view, the reference signal may lie within the area of the illumination line beam 91 at the collection pupil 92. When the collection pupil 92 is aligned to the patient's pupil 93, as shown in example Ex1, full spatial frequency content 94 within the collection pupil 92 is detected. However as shown in example Ex2, when the collection pupil 92 is offset in a first direction perpendicular to the line beam 91 at the patient's pupil 93, part of the spatial frequency 95 is missing, as compared to the spatial frequency 94 of example Ex1. The missing portion corresponds to the extent of misalignment of the collection pupil 92 and patient's pupil 93 along this first direction. It is noted that, as is illustrated in example Ex3, an offset of the collection pupil 92 along a second direction parallel to the line beam 91 (e.g., perpendicular to the line illumination on the retina, not shown) is not readily determinable from the resultant spatial frequency 96 (e.g., using a single scan (e.g., b-scan) along a single scanning dimension at a single scan location on the retina). In this case, the line beam 92 may be rotated to be orthogonal to the second direction and thereby note any offset in this second direction. That is, in some embodiments, two mutually perpendicular scans may be employed, such as by a rotational scanning mechanism, to identify a collection pupil offset within a 2D space. The pupil alignment condition along two dimensions can thus be inferred by the two measurements.

Additionally, or alternatively, since misalignment information is readily determinable along one direction in the line field OCT, one may optionally obtain misalignment information/cues by determining the FFT along that one direction. For example, displacement may be determined by computing the FFT along the dimension parallel to the line beam 91. In this case, misalignment information may be determined using a one-dimensional (1D) FFT, and it may not be necessary to compute the 2D FFT.

Thus, spatial frequency analysis in OCT provides cues to the patient's pupil alignment in a straight-forward manner. The method can alleviate, or eliminate, the need for additional setups/equipment (e.g. iris cameras) to provide alignment cues in the OCT device.

Figure 30:
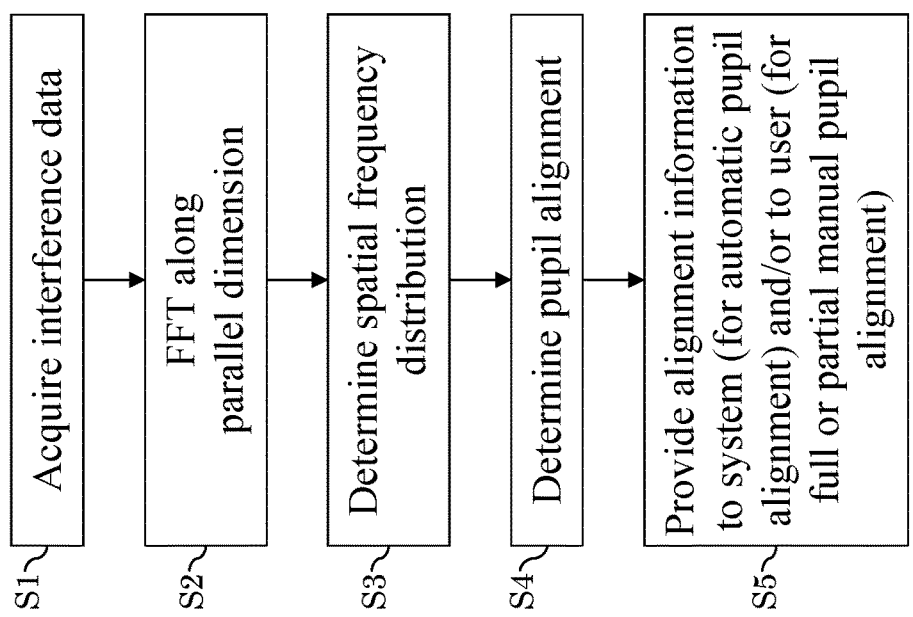
FIG. 30 provides an exemplary workflow for determining pupil alignment in an OCT system.

FIG. 30 provides an exemplary workflow for determining pupil alignment in an OCT system in accord with an embodiment of the present invention. In step S1, at least one OCT interference dataset (e.g., one retinal scan) is collected. The dataset can be, for example, a line field or full field SDOCT/TDOCT dataset. In step S2, FFT of the dataset along the at least one dimension reveals the spatial frequency content along that direction. An optional second FFT along an orthogonal direction may reveal the spatial frequency content along that second direction. For example, in the case of a line field OCT, one may choose to determine the FFT along a direction parallel to the line beam. In step S3, the spatial frequency distribution is determined. The special spatial frequency data is then processed, which determines the patient's pupil alignment relative to the system's collection pupil, step S4. In step S5, the alignment information may be used by the system for auto-alignment or presented to a human system operator in a user-friendly format to guide alignment.

Figure 31:
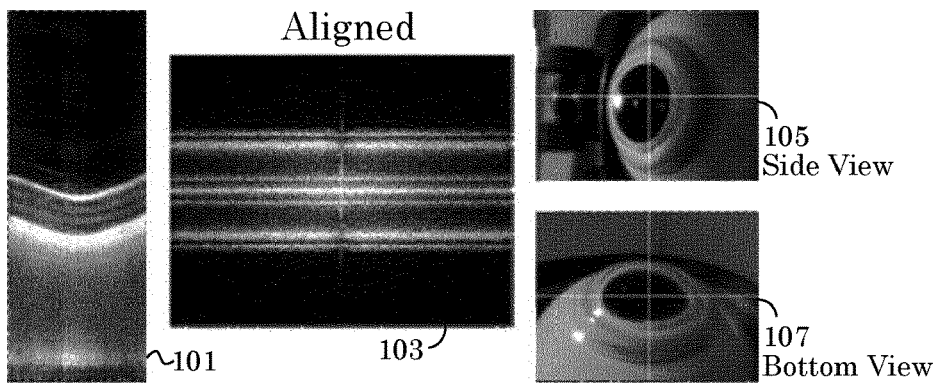
FIGS. 31, 32, 33, and 34 show empirical data of spatial frequency analysis for pupil alignment in an LF-SDOCT.

FIGS. 31, 32, 33, and 34 show empirical data of spatial frequency analysis for pupil alignment in an LF-SDOCT in accord with the present embodiment. Each figure shows a respective OCT image 101, its corresponding interference image 103 in 2D FFT (showing a spatial frequency signal), and corresponding images 105 and 107 of a patient's pupil (e.g. a test eye) taken with the OCT's iris cameras, for reference. FIG. 31 shows a first dataset acquired when the patient's pupil is aligned to the system's collection pupil in the X, Y, and Z directions. As shown, the entire spatial frequency signal is visible in is interference image 103.

Figure 32:
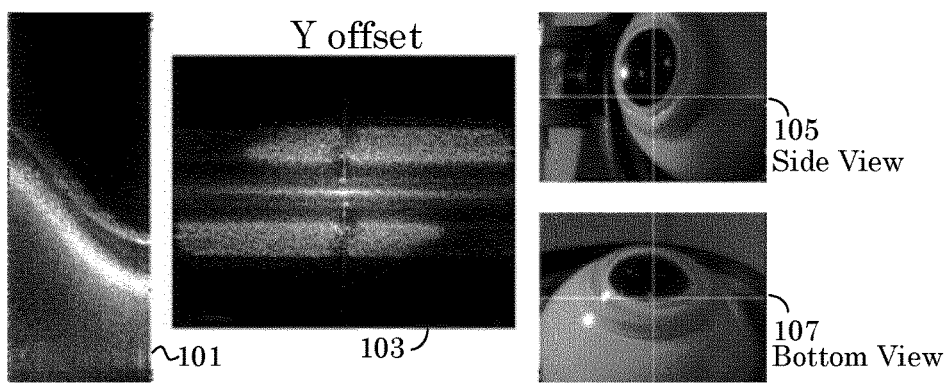

FIG. 32 shows a second dataset acquired when the patient's pupil is offset in the Y direction. In this case, a quarter of the spatial frequency component is missing from its interference image 103 due to the offset. In addition, it is observed that the larger the offset is, the more spatial frequency information is missing. One advantage of the present method is that it is directly related to the OCT illumination and collection, so the patient's perception of the illumination and the resulting OCT images are all relevant to the alignment condition. From the example of FIG. 32, it is evident that the loss of spatial frequency content is also observed as a loss of lateral resolution in the corresponding OCT image 101. The offset along the Y-axis causes tilt of retina structure in the OCT image 101.

Figure 33:
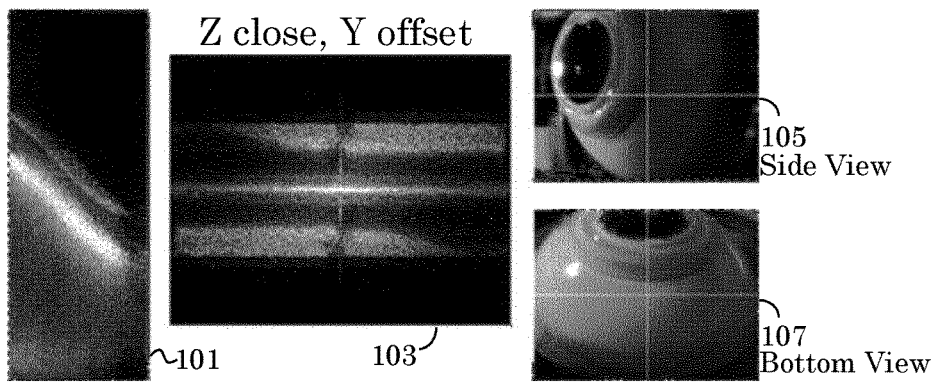
Figure 34:
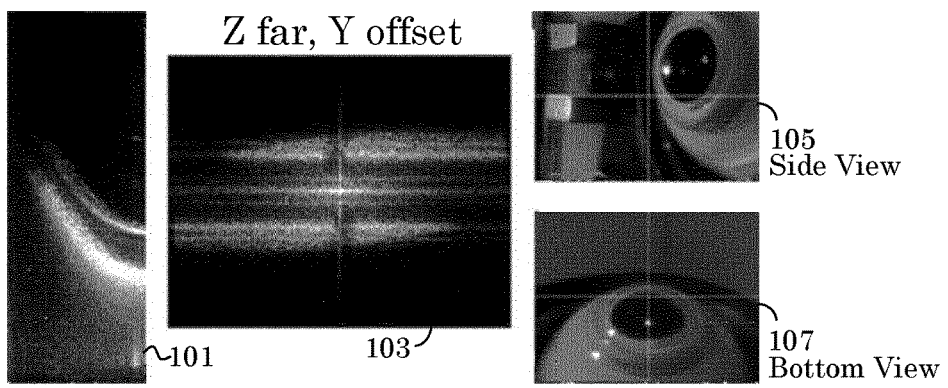

FIG. 33 shows an example of when the eye is too close to the instrument, and FIG. 34 shows an example of when the eye too far from the instrument. Given the Y offset, vignetting in the OCT images 101 of FIGS. 33 and 34 convey information about the offset in the Z-axis. More telling, in their 2D FFT space 103, the Z offset shows up as opposite slopes at the edge of the spatial frequency. In addition, the patient would perceive part of the line illumination vignetted due to the misalignment. This information, singularly or in combination, can be used as cues to guide pupil alignment, either through an automated sub-system, a semi-automated sub-system, or a manual procedure.

In an alternate embodiment, the present invention may be applied to multiple B-scans spanning a 2D region (e.g., of a retina), such as can be found in, or extracted from, a volume/volumetric (or cube) scan (e.g., C-scan). For example, the 2D FFT of the interference in a volumetric LF-SDOCT system (or other scanning type of OCT system) may be used as a cue for a patient's pupil alignment to the OCT system. By using multiple B-scans along displaced positions on the retina, additional alignment information may be obtained. Alignment information in the dimension parallel to the line illumination on the retina can be inferred from the spatial frequency content along that dimension. The spatial frequency content can be visualized and analyzed in the FFT space, in which the patient's pupil alignment relative to the instrument's pupil can be inferred. The pupil alignment in other dimensions may be inferred from the position of the retina within one or more reconstructed B-scans, which may be determined by the optical path-length difference between the light backscattered from the sample and from the reference mirror. Conveniently, information about misalignment in all 3 dimensions (X, Y, Z) may be inferred using 2D FFT analysis of a set of interferograms (e.g., B-scans), which may comprise a volume scan or be selected from among the B-scans that comprise a volume scan.

In a preferred embodiment, the method is implemented with a volumetric LF-SDOCT system. As is explained above with reference to FIG. 29, an illumination beam from a light source forms a line beam 91 at the pupil plane (and also at the retina plane), and the instrument's collection pupil 92 may be an area (e.g., a circular area) centered around the line beam 91.

FIGS. 35-39 show different pupil alignment scenarios and their corresponding 2D FFT analysis as applied, for example, to a volumetric scan. All element in FIGS. 35-39 similar to those of FIG. 29 have similar reference characters and are described above. Since the embodiments of FIGS. 35-39 illustrate a volumetric scan (or multiple B-scans spanning a predetermined 2D region), more than one B-scan may be acquired/analyzed. Depending on the scanning frequency of the OCT system, the number of acquired B-scans may vary. For example, a cub-scan (C-scan) in a typical OCT system/device may include (e.g., capture of acquire) more than hundred B-scans in a single acquisition mode operation. It is be understood, however, that not all the B-scans that comprise a volumetric scan need to be submitted to 2D FFT analysis. Select B-scans spanning a 2D region may be extracted from a C-scan. For example, 2D FFT analysis may be applied to a fraction (e.g., 10%, 25%, 50%, etc.) of the B-scans in a C-scan. For example, every other B-scan (or every fourth B-scan, etc.) in a C-scan may be selected for 2D FFT analysis. The B-scans selected for 2D FFT analysis may span most (e.g., more than half) of the entire scanned region of a C-scan, or may be selected from within a predefined part/fraction (e.g., less than half) of the scanned region of a C-scan.

Figure 35:
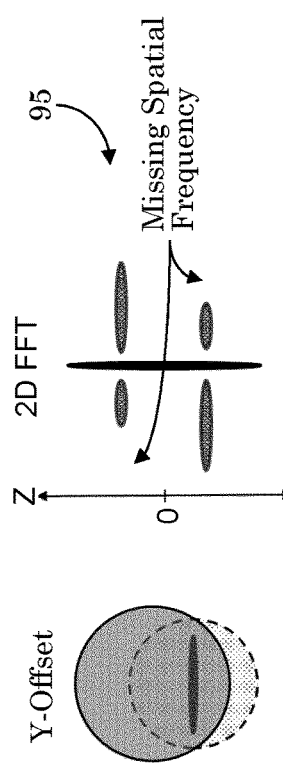
FIGS. 35, 36, 37, 38, and 39 show various pupil alignment scenarios, and their corresponding 2D FFT analysis, as applied to a volumetric scan (e.g., a volume scan, cube scan, or C-scan).
Figure 36:
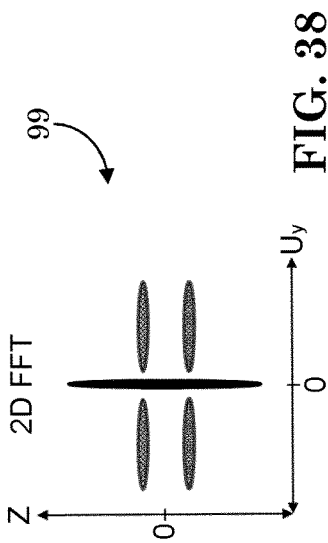

As shown in FIG. 35 (and illustrated in example Ex1 of FIG. 29), within a single B-scan, when the patient pupil 93 is aligned in the X, Y, and Z dimensions, full spatial frequency content 94 within the collection pupil is detected. As is the case of example Ex2 in FIG. 19, within a single B-scan as shown in FIG. 36, when the pupil is offset perpendicular to the line illumination at the pupil (or parallel to the dimension of line illumination on the retina), e.g., along the Y-axis, part of the spatial frequency 95 is missing. The missing portion may correspond to the extent of misalignment of the patient pupil 93 along this direction.

Figure 37:
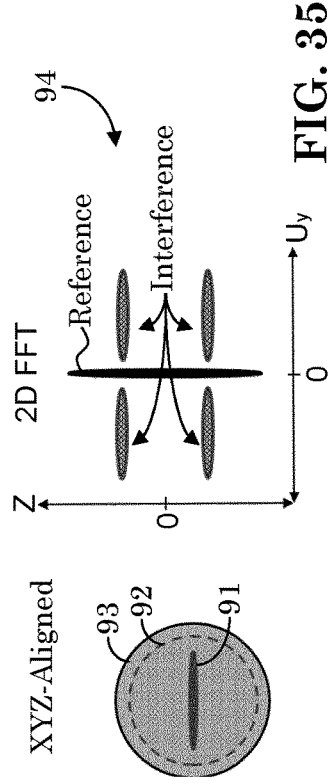
Figure 38:
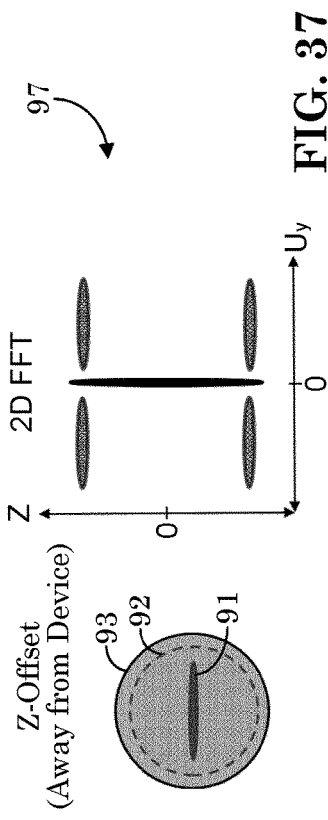

As illustrated in FIG. 37 and FIG. 38, incorrect working distance (e.g., in the Z direction) may also be detected within a single B-scan by comparing the locations/positions of its spatial interference 97 and 99, respectively, with the spatial interference 94 of the aligned condition (e.g., shown in FIG. 35). When the patient pupil 93 is not located at the correct working distance in the Z direction (either too far from the imaging device as shown in FIG. 37 or too close to the imaging device as shown in FIG. 38), the vertical location of their respective spatial interference 97 and 99 will differ from the aligned case 94. The offset of the spatial interference relative to the aligned state may provide information about misalignment along the working distance (Z) and direction of misalignment.

FIGS. 35 to 38 illustrate that misalignment information in the Y and Z directions may be extracted from a single B-scan. Nonetheless, it is to be understood that additional Y and Z misalignment information may be extracted from additional B-scans (e.g., from different locations on a retina), if desired, as this would provide additional information, such as for confirming an amount of calculated misalignment or for averaging misalignment measurements from multiple B-scans. As is explained above, misalignment in the X-direction may be determined by rotating the line beam 91 to an orthogonal position and determining its resultant spatial frequency. Detection of misalignment in the X direction, however, may also be determined without rotating the line beam 91 by comparing (and/or contrasting) the 2D FFT space of multiple B-scans from different locations on the patient's retina (e.g., by determining how the B-scans vary in 2D FFT space with varying location).

Figure 39:
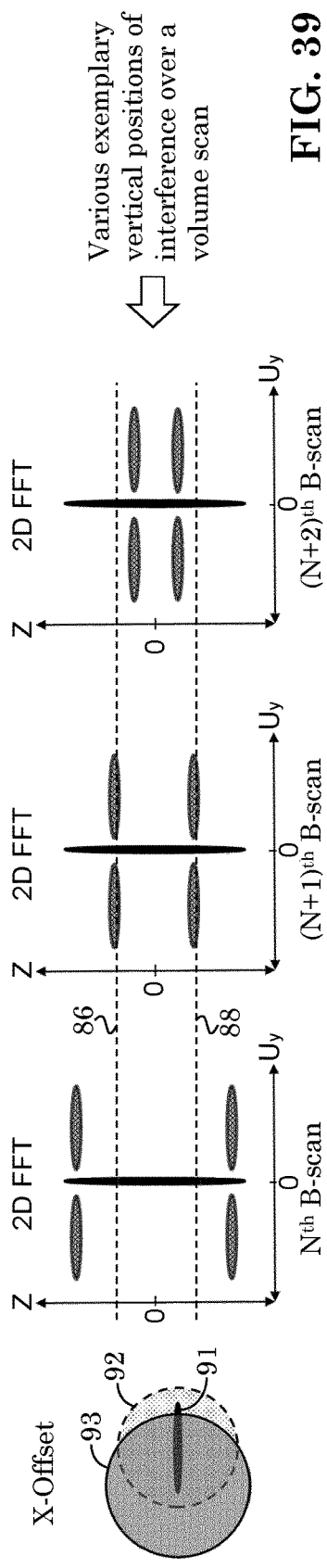

With reference to FIG. 39, in a volumetric OCT scan, (or alternatively acquiring/capturing/accessing an arbitrary number of B-scans, e.g. 8 B-scans, spanning a 2D region), lateral misalignment of the patient pupil in the X-direction (e.g., without rotation of the line beam 91) may appear as a progressive shift of the retina position across the multiple B-scans (or volume) and as a different vertical location of interference in the 2D FFT space. Optionally, the volumetric scan may be part of an entire C-scan capture mode operation of the OCT system, or the arbitrary (e.g., predefined) number of B-scans (e.g., 8 B-scans) may be part of a specialized alignment-scan mode operation of the OCT system. As shown, as the 2D FFT of different B-scans along a given 2D region of the retina are determined, the positions of the interference patterns (e.g. vertically along the Z-axis) vary. For example, they may come closer to each (e.g. approach each other), or may move farther from each other (distance themselves from each other) depending upon the amount of X direction misalignment. In the present example, the 2D FFT for the $N^{th}$ B-scan shows that the spatial interference patterns are far apart from each other and from the positions of correct alignment 86/88. The spatial interference patterns, however, come closer toward each other as one determines the 2D FFT of the $(N+1)^{th}$ B-scan and the $(N+2)^{th}$ B-scan. By determining how the 2D FFT interference varies with B-scan location (e.g., relative to the positions of proper alignment 86/88) one may infer misalignment information in the X-direction (e.g., an amount and/or direction of misalignment). The misalignment in the X direction (e.g., amount and/or direction±X) may be related to the amount and/or to the direction by which the 2D FFT interference varies from B-scan to B-scan across a given 2D region on the retina. Additional information may be gleaned by combining this X-direction information with extracted Y and Z information from one or more B-scans within the given 2D region.

Thus, analysis of the two-dimensional interferograms in volumetric OCT (e.g., LF-SDOCT) can provide cues of the patient's pupil alignment (relative to the OCT device) in all directions in a straight-forward manner. The method can alleviate or even eliminate the need for additional setups (e.g. iris camera) to provide alignment cues in such a device. It also can provide real-time alignment feedback to the OCT operator during scan acquisition, and/or can be used for auto-alignment and/or auto-acquisition of a scan.

Figure 40:
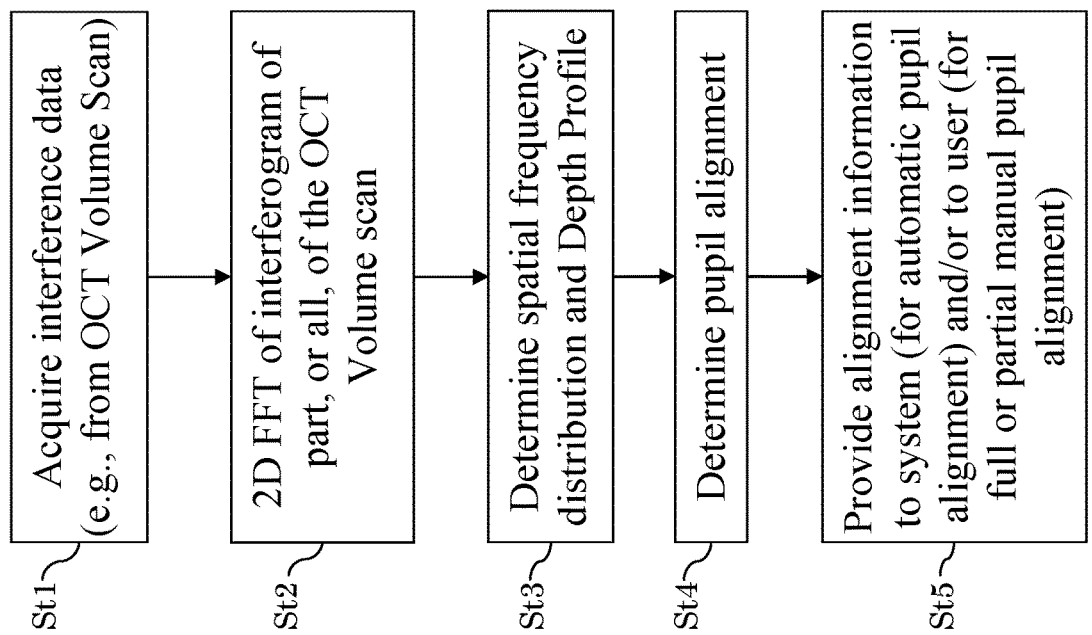
FIG. 40 provides an exemplary workflow of the present invention, as may be applied to volumetric OCT data.

FIG. 40 provides an exemplary workflow of the present invention, as may be applied to volumetric OCT data. In step St1, at least one volumetric LF-SDOCT interference dataset (e.g. including multiple B-scans) is collected. In step St2, 2D FFT analysis is applied to the (interferogram) dataset, or select B-scans from the dataset spanning a 2D region. In step St3, the spatial frequency distribution and depth profile is determined. That is, 2D FFT analysis reveals the spatial frequency-depth profile (information along Z direction and spatial frequency along Y direction). In step St4, processing of this data over the whole cube, or a select number of the B-scans in the cube or a select portion of the cube, determines the patient's pupil alignment relative to the system's collection pupil (e.g., in three dimensions). In step St5, the alignment information may be used by the OCT system for auto-alignment of the system to the patient, and/or may be presented to the system operator and/or to the patient in a user-friendly format to guide system alignment. That is, the system may use the determined pupil alignment to provide the system operator or the patient with suggestions for adjusting the system or the patient to improve alignment, or suggest possible sources (or incorrect system use) that may be contributing to incorrect alignment. A patient may use the provided information in a patient-self-alignment application.

Figure 41A:
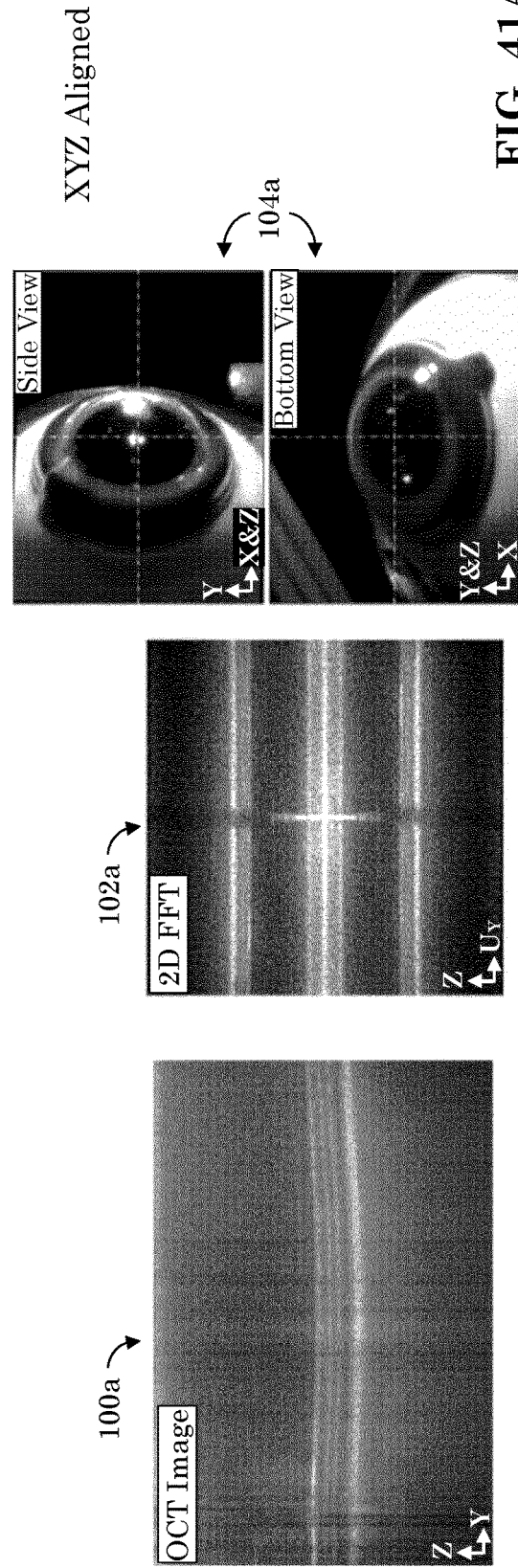
FIGS. 41A and 41B provide experimental data illustrating the use of 2D FFT analysis to determine misalignment in the Y direction.
Figure 41B:
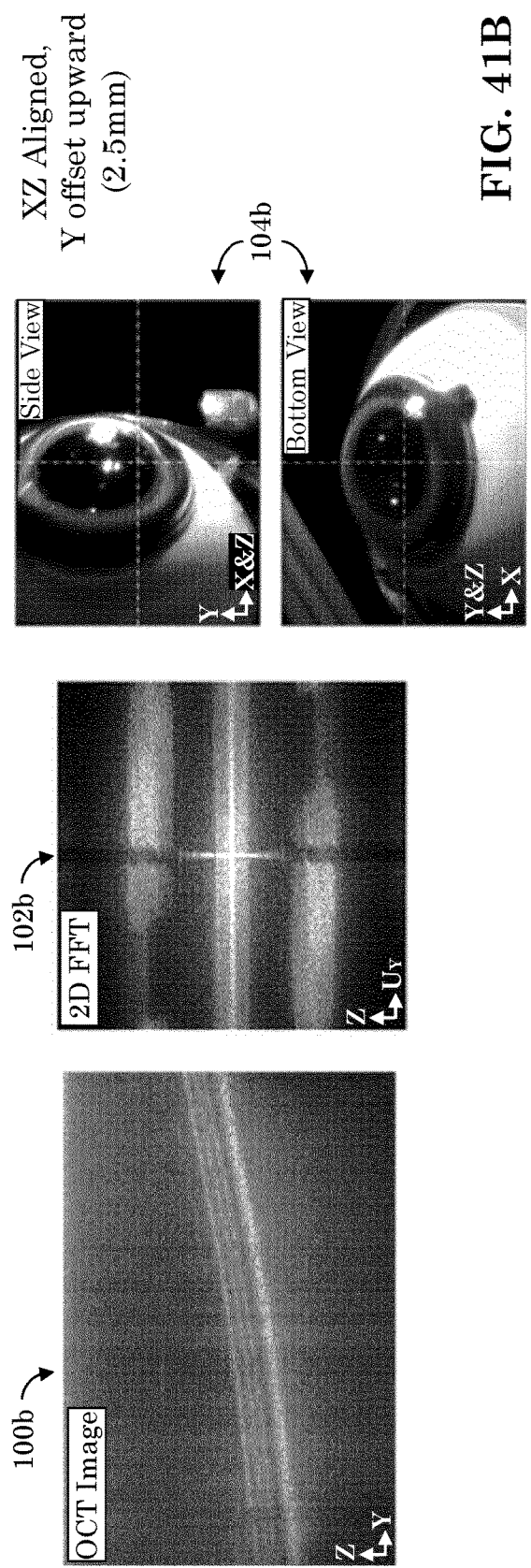

One advantage of the present embodiment is that it is directly related to the OCT illumination and collection, so the patient's perception of the illumination and the resulting OCT images are all relevant to the alignment condition. FIGS. 41A and 41B provide experimental data illustrating the use of 2D FFT analysis to determine misalignment in the Y direction. FIGS. 41A and 41B respectively show an OCT image 100a/100b of a B-scan, a corresponding 2D FFT analysis 102a/102b of the B-scan, and images 104a/104b (photographs) of the eye under test (e.g., a test eye) as seen (image captured) by a system iris camera, such as would typically be used to determine proper patient-to-system alignment in a traditional OCT system. For comparison purposes, FIG. 41A shows a state of proper XYZ alignment, and FIG. 41B shows a state of misalignment in the Y direction/dimension (with the XZ dimensions remaining in a proper alignment state). As is explained above, misalignment information in the Y direction may be extracted from a single B-scan. Therefore, FIG. 41B shows the OCT 100b image and the interference in 2D FFT space 102b of a single B-scan, and the corresponding iris camera images 104b, but as is explained above, Y-misalignment may optionally be determined from more than one B-scan of a volume OCT scan.

The dataset of FIG. 41A is acquired when the patient's pupil is aligned to the system's collection pupil in X, Y, and Z directions. The dataset of FIG. 41B is acquired when the patient's pupil is offset in the Y direction (e.g., about 2.5 mm toward the top of the optical axis). In the present example, about a quarter of the spatial frequency component 102b is missing (compared to spatial frequency component 102a of the aligned case) due to the offset. Also, the interference pattern stripes of frequency component 102b are thicker, or wider, as compared to those of the aligned state of FIG. 41A. In addition, it has been observed that the larger the misalignment offset, the larger the amount of the spatial frequency pattern that is missing (e.g., they may be proportional and/or correlated to each other). The loss of spatial frequency content is also observed as loss of lateral resolution in the OCT image 100b. That is, the offset in Y may cause a tilt of the retina structure, as shown in the OCT image 100b.

Figure 42A:
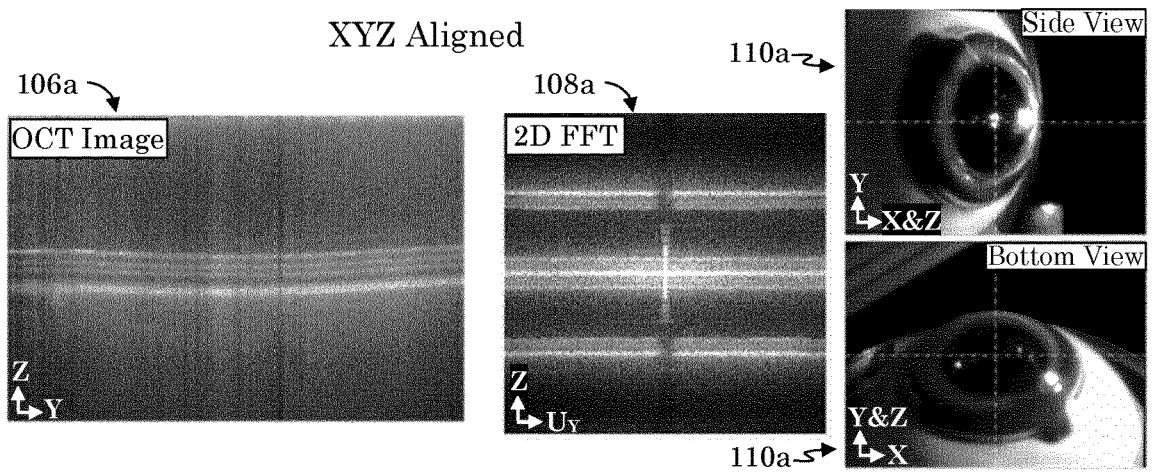
FIGS. 42A, 42B, and 42C illustrate experimental data related to detecting Z-misalignment using 2D FFT analysis in an LF-SDOCT.
Figure 42B:
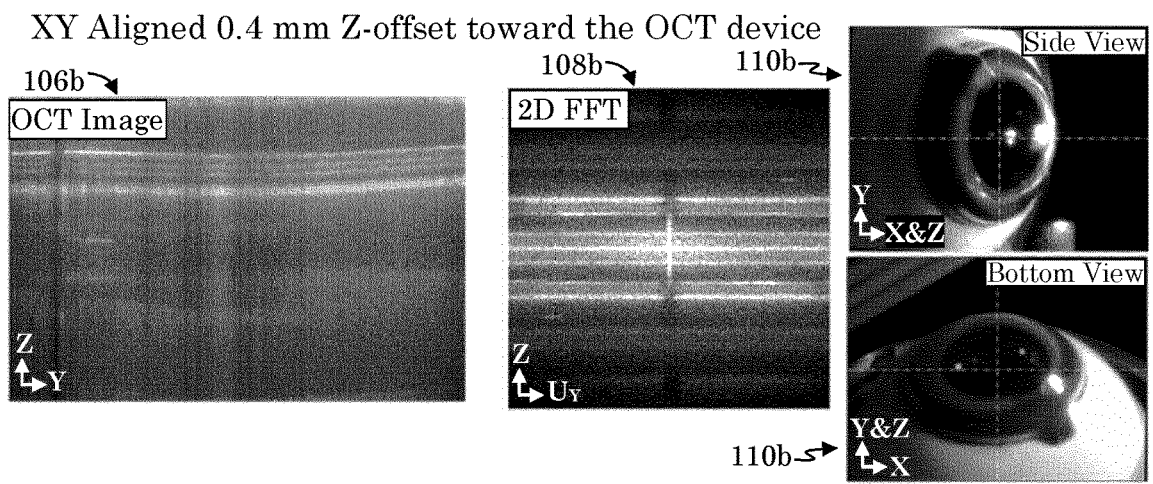
Figure 42C:
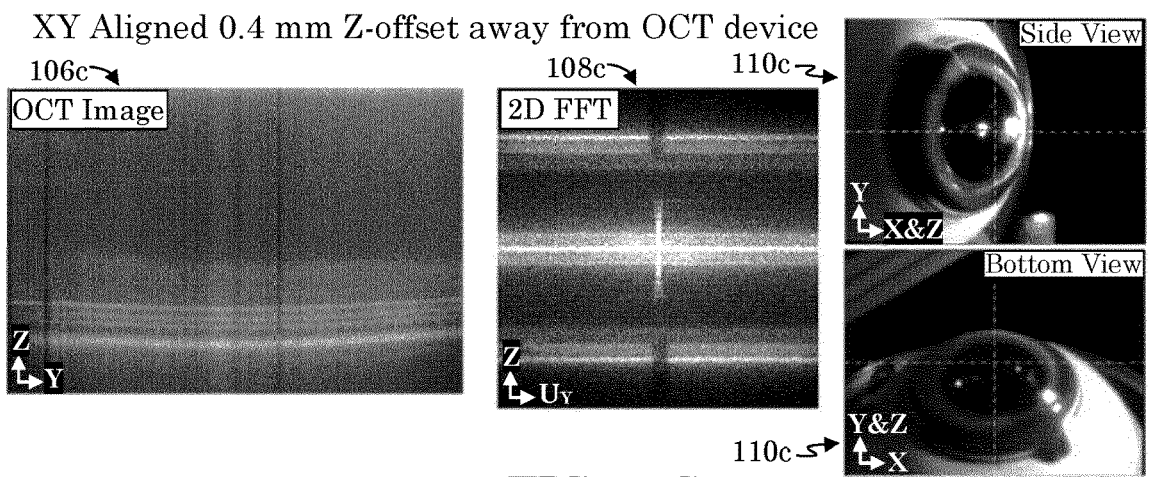

FIGS. 42A, 42B, and 42C illustrate experimental data related to detecting Z-misalignment using 2D FFT analysis in an LF-SDOCT. That is, the effect of Z-misalignment (misalignment along the optical axis of the OCT system) on the OCT image and 2D FFT is shown. FIGS. 42A, 42B, and 42C respectively show an OCT image 106a/106b/106c of a B-scan, a corresponding 2D FFT analysis 108a/108b/108c of the B-scan, and corresponding images 110a/110b/110c of a test eye at the time the B-scans were acquired., FIG. 42A shows a state of proper XYZ alignment, FIG. 42B shows a state of misalignment in the Z direction (e.g. Z-offset) toward the OCT device (with XY in proper alignment), and FIG. 42C shows a state of misalignment in the Z direction away from the OCT device (with XY in proper alignment).

The vertical axes in the 2D FFT and OCT image represent the depth profile (information along the Z direction). As a result, any difference in the distance between the patient's pupil and the imaging device from the designed/desired working distance may be represented along this axis. The direction of misalignment can be also derived. For example, if the patient's eye is placed closer than the designed working distance to the imaging device, the interference stripes get closer along the vertical axis in 2D FFT data (108b as compared to 108a) and retinal layers are placed/shown more toward the top of the OCT image (106b as compared to 106a). FIG. 42B represents an exemplary case having a 0.4 mm Z-offset closer (e.g., toward) to imaging device. Also, if the patient's eye is placed further away from the designed working distance (as illustrated in FIG. 42C), the interference stripes 108c tend to separated/move away from each other along the vertical axis in the 2D FFT data (108c as compared to 108a) and the retinal layers in OCT image 106c are shown/placed more toward the bottom of OCT image (106c as compared to 106a). The last dataset of FIG. 42c illustrates a case having a 0.4 mm Z-offset, away from the imaging device (e.g., OCT system).

Figure 43A:
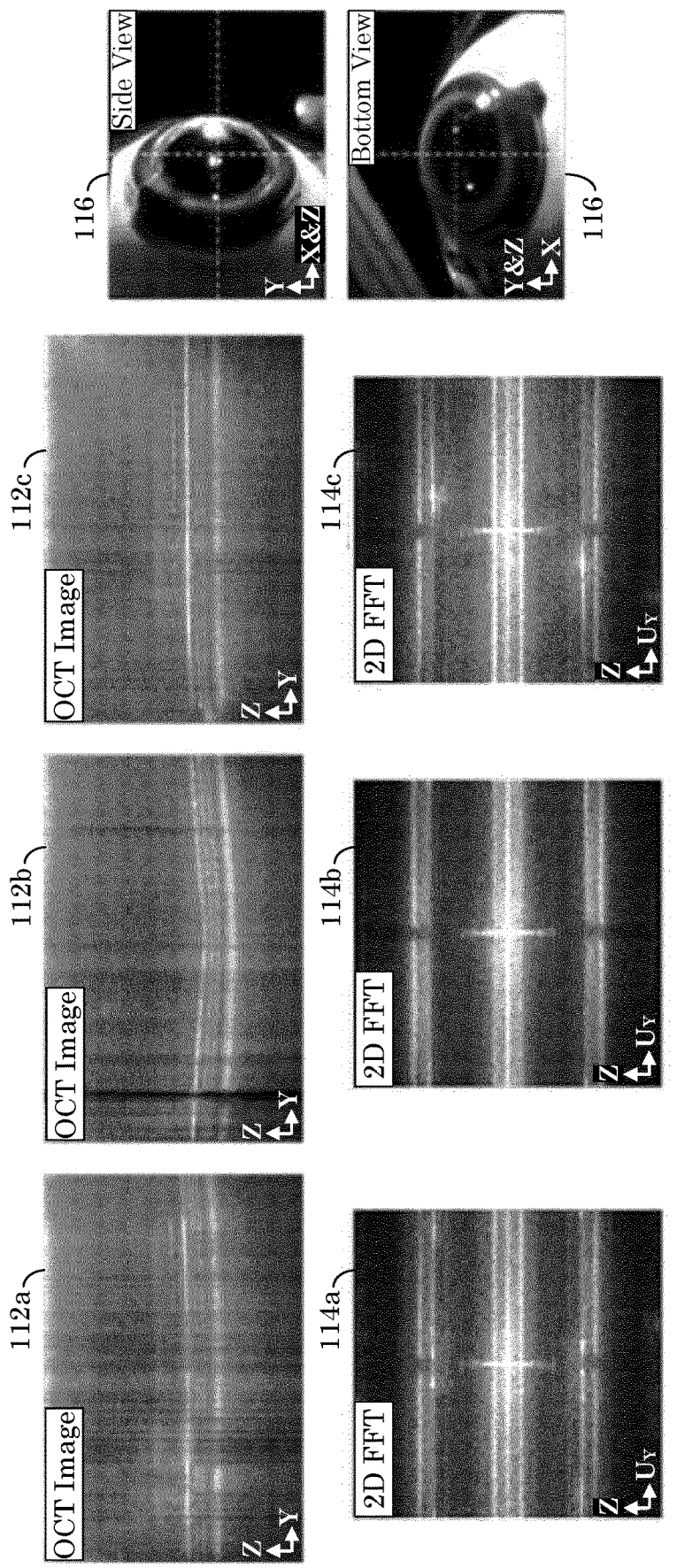
FIG. 43A illustrates OCT images of three select B-scans (and their corresponding 2D FFT data) from a cube scan of a test eye in full XYZ aligned with an imaging system.
Figure 43B:
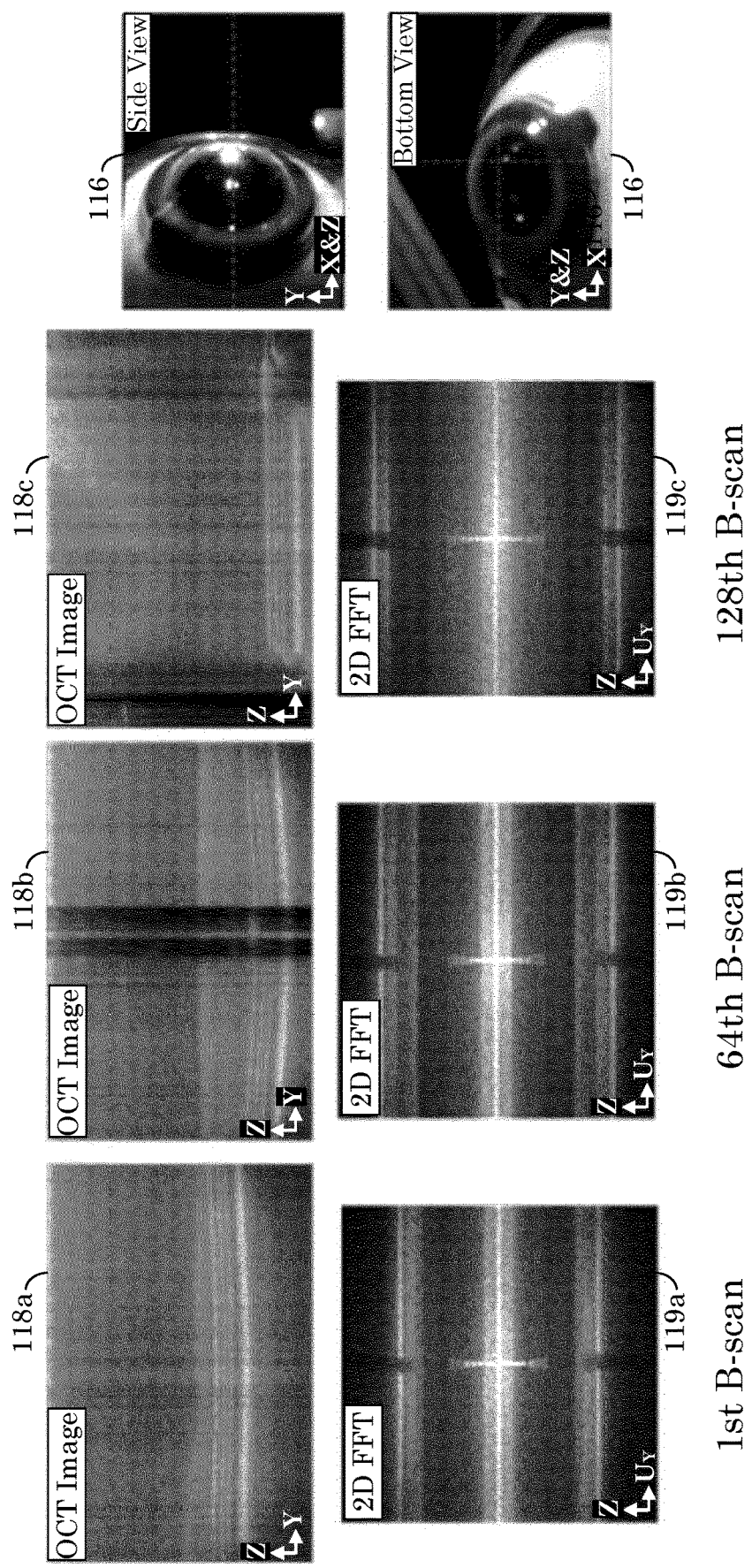
FIG. 43B illustrates three select OCT images of three B-scans (and their corresponding 2D FFT data) from a cube scan of a test eye with a misalignment in the X-direction with respect to the imaging system.

As is explained above, access to multiple B-scans from different parts of a 2D region (e.g., on a retina or other target to be imaged/scanned), permits one to determine X-misalignment information without rotating a current scanning direction (e.g., without rotating a scanning line beam). For example, by acquiring a volumetric OCT scan (or acquiring multiple B-scans spanning a 2D region) and comparing the vertical position and/or intensity of interference stripes in the 2D FFT data, X-misalignment can be detected (e.g., X-misalignment information can be determined). For this purpose, one may use an existing whole cube scan (e.g. 128 B-scans from a typical C-scan acquisition mode) or part of the whole cube scan (e.g. 8 b-scans, which may be part of a separate alignment mode, e.g., a scan acquisition mode separately implemented for alignment purposes). For comparison purposes, FIG. 43A illustrates OCT images 112a-112c of three select B-scans (and their corresponding 2D FFT data 114a-114c) from a cube scan of a test eye 116 in full XYZ aligned with an imaging system, and FIG. 43B illustrates three select OCT images 118a-118c of three B-scans (and their corresponding 2D FFT data 119a-119c) from a cube scan of the test eye 116 with a misalignment in the X-direction with respect to the imaging system (while the YZ directions remain aligned). That is, FIGS. 43A and 43B provide a comparison between a fully aligned case (FIG. 43A) and a case with 1 mm X-misalignment (FIG. 43B). In both cases, the three exemplary OCT images of B-scans (e.g., 112a-112c in FIG. 43A, and 118a-118c in FIG. 43B), and their respective 2D FFT data, are representative of the first, middle, and the last B-scans of a whole cube scan. As shown, misalignment in the X-direction manifests itself as a growing separation between the frequency components of in spatial frequency analysis (2D FFT 119a to 119c) as one goes from the 1st B-scan, to the 64th B-scan, to the last (128th) B-scan in the volumetric LF-SDOCT scan.

Thus, the 2D FFT of the line-field interferogram can directly be used as a cue for pupil alignment. For example, it may be used to detect XYZ misalignment by comparing the 2D FFT of a current scan with 2D FFT data of a fully aligned case as a reference, and/or some misalignment cases, such as misalignment in the Y and X directions, may be detected/determined/measured without a reference scan.

Alternatively, or in addition, 2D FFT data may be processed (such as by filtering, binarization, finding the centroid, and/or inputting to a machine learning algorithm) to obtain more information of the pupil alignment or localization.

FIG. 44 shows exemplary processing steps that may be executed to determine pupil alignment from the spatial frequency content. First, in step St10, the top-half 120 of the signal in 2D FFT space 121 (e.g., the true interference signal) is cropped to remove the complex conjugate artifact. The cropped signal is summed over each spatial frequency (e.g., column) in step St12 and image 122. This defines a 1D profile that represents the strength of back scattered signal with respect to spatial frequency. A linear ramp 123 may be used as a variable threshold to binarize the pupil alignment of step St12 for positive and negative spatial frequencies, respectively, as is illustrate in step St13 and shown in binary mask 125. Values higher than the threshold defined by the ramp 123 are determined to indicate a portion of the patient's pupil that is aligned to the instrument's collection pupil. Binary mask 125 is thus defined by showing in color (e.g., grey) the aligned portions and showing in white the non-aligned portions. In step St14, the center of mass of binary mask 125 is computed to determine a centroid 126 of the patient's pupil, which provides alignment information (e.g., an alignment measure) by indicating its relative position along an axis, e.g. the Y-axis. This alignment measure may then be used in an automated alignment subsystem, or component, of the imaging system, or provided to a user to aid in a manual alignment procedure.

Alignment information may be represented in multiple ways that the user can easily interpret. FIGS. 45, 46, and 47 illustrate multiple implementations for representing alignment information to a user, such as via a screen. FIG. 45 shows one implementation that displays an area indicating the position of the instrument (e.g., collection) pupil relative to the patient's pupil, which may be shown as a colored or shaded area. FIG. 46 shows an alternate implementation where a shaded area is used to indicating the portion of the patient's pupil that is aligned with (e.g., located within the region of) the instrument's collection pupil. If the pupil position and size can be further inferred from the processed data, the information may also be presented to the user graphically. FIG. 47 shows an alternate embodiment where, for simplicity, only the centroid of the patent's pupil is displayed to the user.

Figure 48:
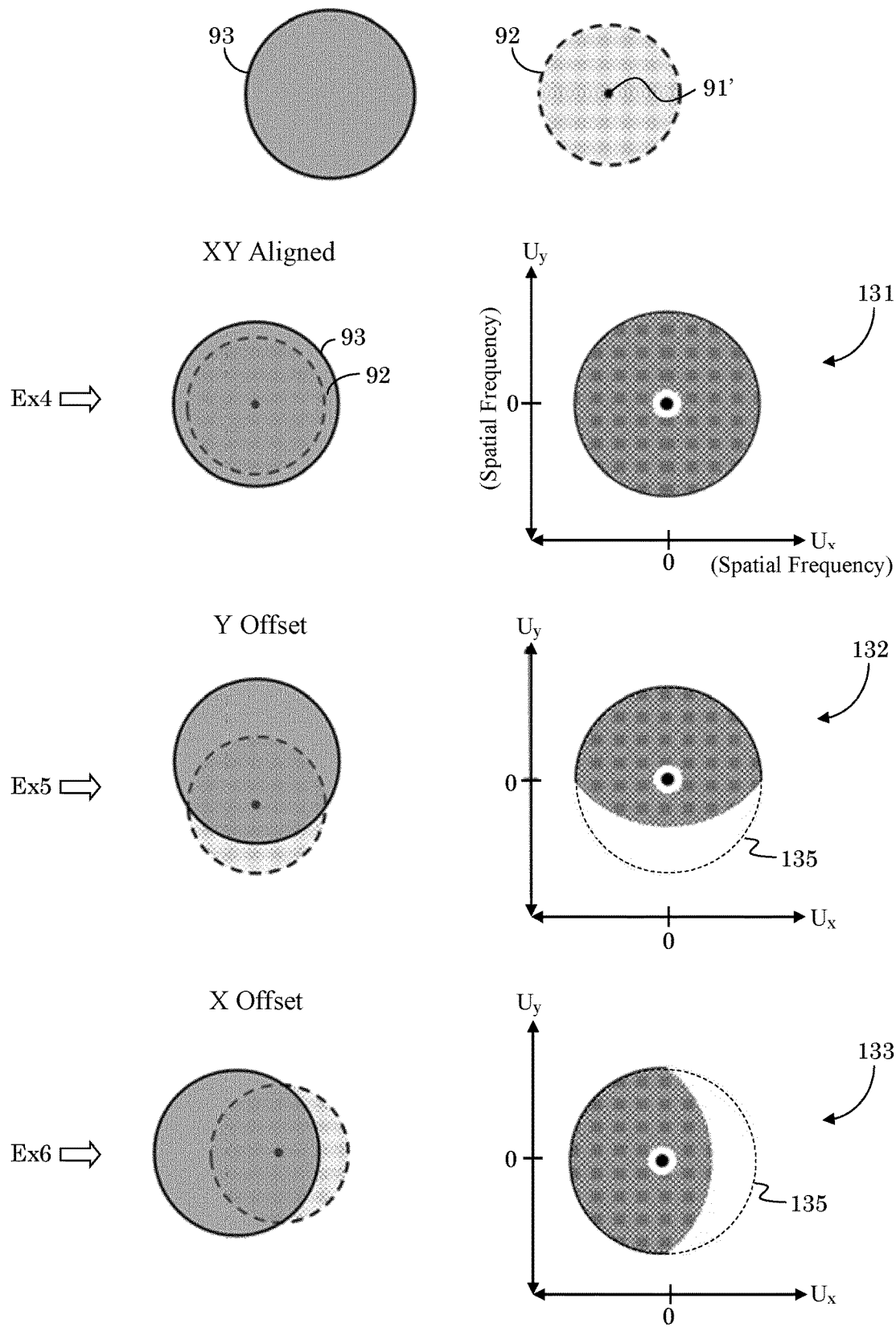
FIG. 48 illustrates another example of the present invention, as applied to a full-field (FF) TDOCT system.

FIG. 48 illustrates another example of the present invention, as applied to a full-field (FF) TDOCT system. As before, the patient's pupil 93 is shown as a shaded region and the collection pupil is shown as a dotted circle 92. In the present case, the illumination forms a small circular area 91' at a focal point at the pupil plane, and the collection pupil 92 is a circular area centered around the illumination focal point 91'. Example Ex4 shows a situation where the collection pupil 92 is aligned to the patient's pupil 93. In this case, the full spatial frequency content 131 within the collection pupil is detected.

When the pupil is offset, as shown in examples Ex5 and Ex6, a corresponding part of the spatial frequency 132 and 133, respectively, is missing. In each of examples Ex5 and Ex6 the missing portion of their respective spatial frequency 132 and 133 is shown enclosed within as a dotted partial circle 135. Again, the missing portion corresponds to the extent of pupil's misalignment. It is noted, however, that in the present full-field case, the 2D misalignment can be directly visualized in the FFT space (e.g., from the 2D FFT) in any direction.

The outcome of the above pupil detection methods may be fed back to a user for alignment and/or to the instrument for auto-alignment and/or to trigger auto-acquisition of scan or image.

Figure 49:
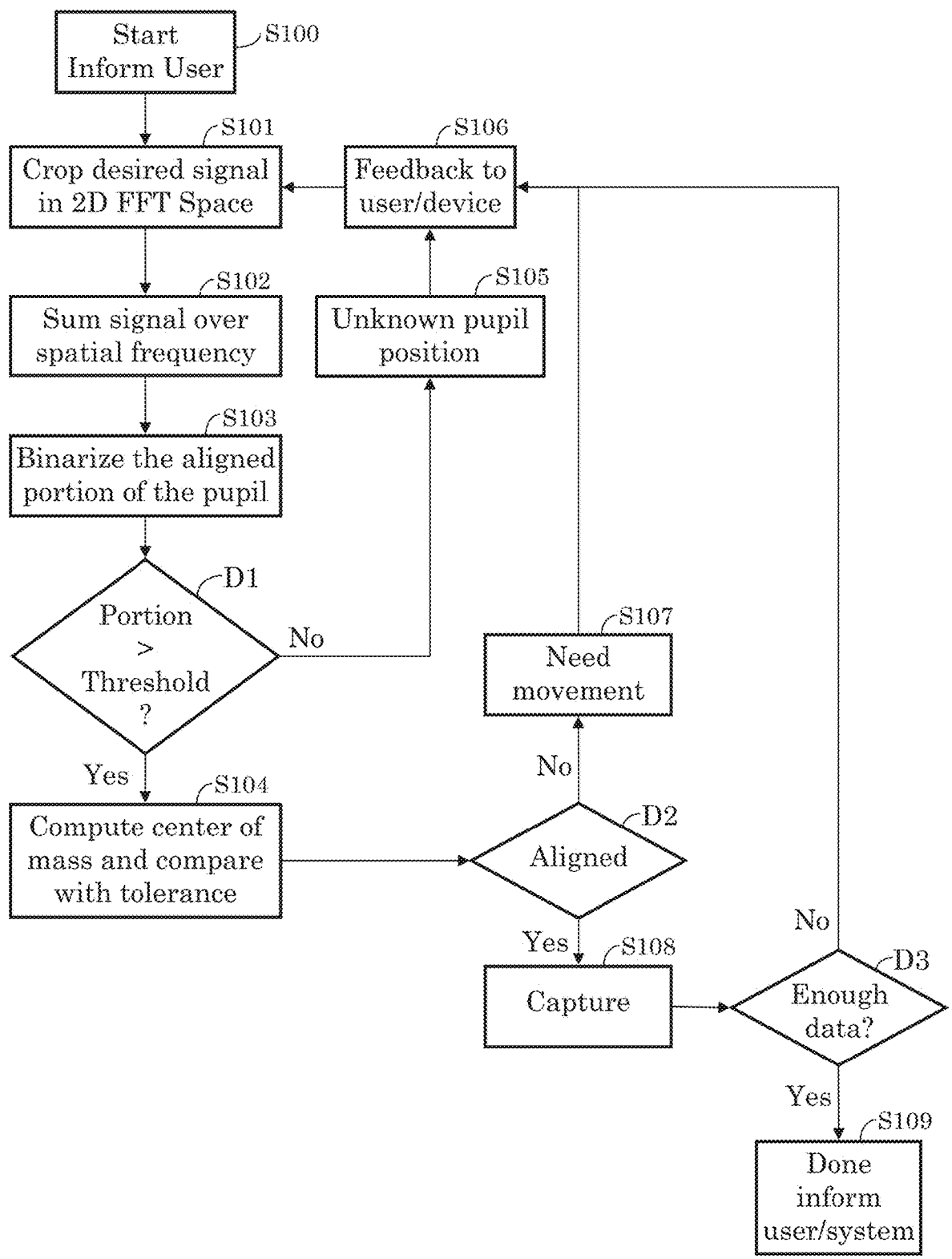
FIG. 49 illustrates an exemplary workflow using spatial frequency analysis for alignment and acquisition feedback.

FIG. 49 illustrates an exemplary workflow using spatial frequency analysis for alignment and acquisition feedback. The present example builds on the workflow of FIG. 44, to provide additional feedback functionality. All elements similar to those of FIG. 44 have similar reference characters and are described above. The present workflow may start at step S100 by informing a system operator (or a system automated routine or mechanism) to start system-to-pupil alignment. This may be followed by the above-described steps for pupil alignment. These steps may include step S101 of collecting data (e.g. a scan), computing its 2D FFT (or a 1D FFT along a direction parallel to a line scan beam SB), and cropping the desired signal (e.g., the true interference signal) from the 2D FFT space. This may be followed with step S102 of summing the cropped signal over the spatial frequency, and step S103 of binarization the summed signal. At this point, a first decision step D1 may check if the aligned portion of the pupil is higher than a predefined percentage threshold (e.g. 50%), which may have been empirically determined to be sufficient overlap between the patient pupil and the instrument's collection pupil to capture a good image. If not (D1=No), the system may determine that the pupil position is unknown (step S105), and this information may be fed back to the user or system (step S106) to keep searching until this alignment condition is met. However, if decision step D1 determines that the aligned portion of the pupil is higher than a predefined threshold (D1=Yes), then the process may proceed with step S104 and compute the center of mass. A second decision step D2 then checks if the determined center of mass indicates good alignment within a predefined tolerance range (e.g. within 5 pixels) or in which direction the patient/instrument should be moved to achieve better alignment. If decision step D2 determines that that the pupil is not sufficiently aligned (D2=No) and a position adjustment is needed, this information is fed back to the user or system in steps S107 and S106. For example in FIG. 44, the center of mass 126 was determined to be above an alignment position 127. This information could be fed back to the system or patient or system operator to lower the patient's pupil and improve alignment with the instrument. If decision step D2 determines that the pupil is sufficiently aligned within predefined tolerances (D2=Yes), a scan or image may be automatically captured in step S108. A third decision step D3 may then check enough data (e.g., scans) have been collected. If additional data is needed (D3=No), then the process may inform the system or user (step S106) before collecting new data at step S101. That is, the present process may be repeated until enough data is collected and D3=Yes. At this point, step S109, the OCT imaging operation may stop, and the user may be informed that the session has ended.

The above embodiments for using spectral analysis for determining patient pupil to system collection pupil alignment are exemplary implementations. Other implementation will be apparent to those familiar in the art. For example, the present method may be implemented using a LF-TDOCT or a FF-SDOCT system. Also, the method may be implemented in a point scanning system that detects off-axis back-scattered light. As yet another example, if interference is detected at the pupil conjugate plane, as using a holoscopy approach, the spatial distribution of the back-scattered light within the system's collection pupil can directly be inferred by the holoscopy spatial distribution signal. In this case, the steps of determining (2D) FFT for spatial frequency distribution may be bypassed.

Thus, the spatial frequency distribution in the FFT space can directly be used as a cue for pupil alignment.

Hereinafter is provided a description of various hardware and architectures suitable for the present invention.

Fundus Imaging System

Two categories of imaging systems used to image the fundus are flood illumination imaging systems (or flood illumination imagers) and scan illumination imaging systems (or scan imagers). Flood illumination imagers flood with light an entire field of view (FOV) of interest of a specimen at the same time, such as by use of a flash lamp, and capture a full-frame image of the specimen (e.g., the fundus) with a full-frame camera (e.g., a camera having a two-dimensional (2D) photo sensor array of sufficient size to capture the desired FOV, as a whole). For example, a flood illumination fundus imager would flood the fundus of an eye with light, and capture a full-frame image of the fundus in a single image capture sequence of the camera. A scan imager provides a scan beam that is scanned across a subject, e.g., an eye, and the scan beam is imaged at different scan positions as it is scanned across the subject creating a series of image-segments that may be reconstructed, e.g., montaged, to create a composite image of the desired FOV. The scan beam could be a point, a line, or a two-dimensional area such a slit or broad line.

Figure 50:
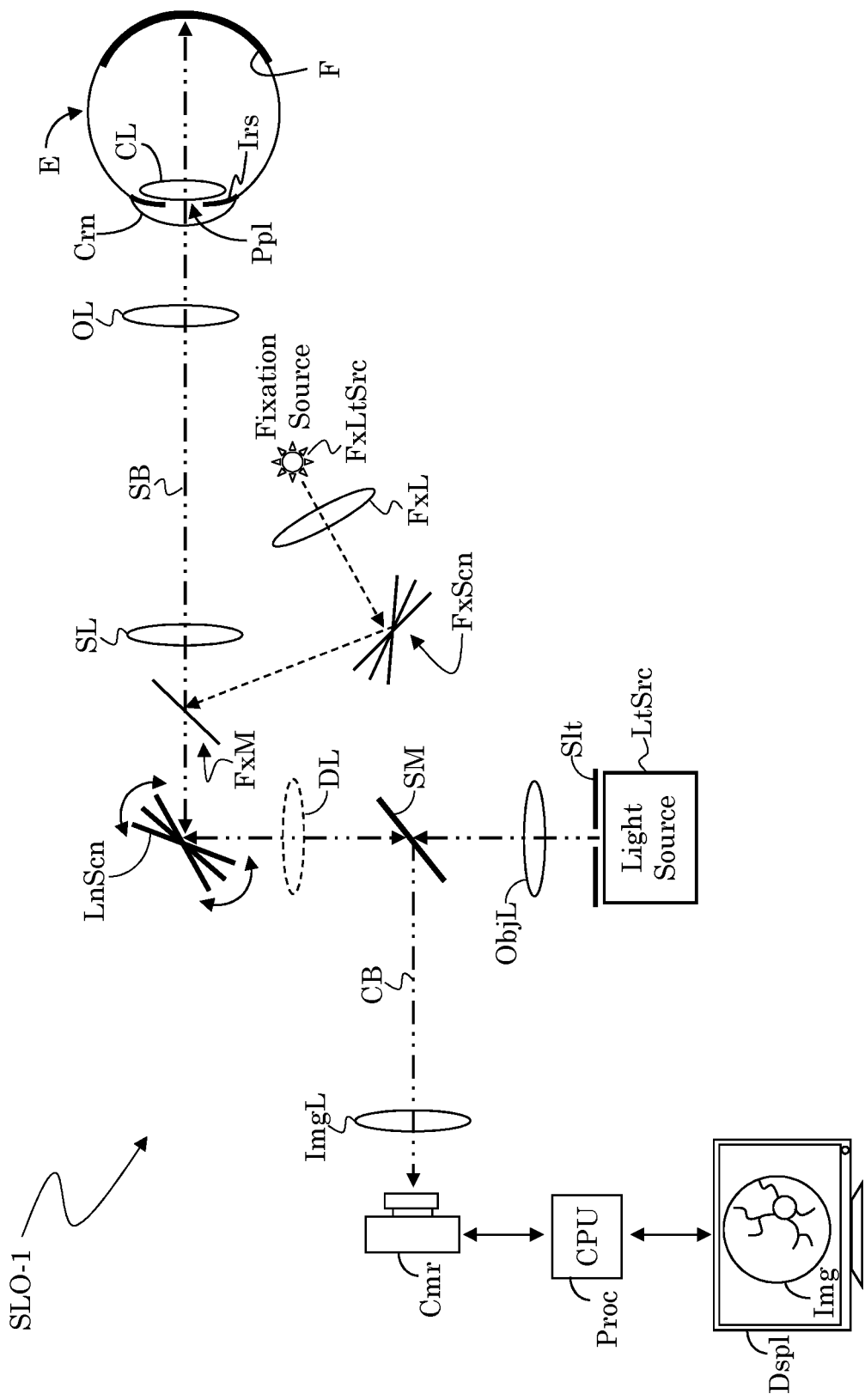
FIG. 50 illustrates an example of a slit scanning ophthalmic system for imaging a fundus.

FIG. 50 illustrates an example of a slit scanning ophthalmic system SLO-1 for imaging a fundus F, which is the interior surface of an eye E opposite the eye lens (or crystalline lens) CL and may include the retina, optic disc, macula, fovea, and posterior pole. In the present example, the imaging system is in a so-called "scan-descan" configuration, wherein a scanning line beam SB traverses the optical components of the eye E (including the cornea Crn, iris Irs, pupil Ppl, and crystalline lens CL) to be scanned across the fundus F. In the case of a flood fundus imager, no scanner is needed, and the light is applied across the entire, desired field of view (FOV) at once. Other scanning configurations are known in the art, and the specific scanning configuration is not critical to the present invention. As depicted, the imaging system includes one or more light sources LtSrc, preferably a multi-color LED system or a laser system in which the etendue has been suitably adjusted. An optional slit Slt (adjustable or static) is positioned in front of the light source LtSrc and may be used to adjust the width of the scanning line beam SB. Additionally, slit Slt may remain static during imaging or may be adjusted to different widths to allow for different confocality levels and different applications either for a particular scan or during the scan for use in suppressing reflexes. An optional objective lens ObjL may be placed in front of the slit Slt. The objective lens ObjL can be any one of state-of-the-art lenses including but not limited to refractive, diffractive, reflective, or hybrid lenses/systems. The light from slit Slt passes through a pupil splitting mirror SM and is directed towards a scanner LnScn. It is desirable to bring the scanning plane and the pupil plane as near together as possible to reduce vignetting in the system. Optional optics DL may be included to manipulate the optical distance between the images of the two components. Pupil splitting mirror SM may pass an illumination beam from light source LtSrc to scanner LnScn, and reflect a detection beam from scanner LnScn (e.g., reflected light returning from eye E) toward a camera Cmr. A task of the pupil splitting mirror SM is to split the illumination and detection beams and to aid in the suppression of system reflexes. The scanner LnScn could be a rotating galvo scanner or other types of scanners (e.g., piezo or voice coil, micro-electromechanical system (MEMS) scanners, electro-optical deflectors, and/or rotating polygon scanners). Depending on whether the pupil splitting is done before or after the scanner LnScn, the scanning could be broken into two steps wherein one scanner is in an illumination path and a separate scanner is in a detection path. Specific pupil splitting arrangements are described in detail in U.S. Pat. No. 9,456,746, which is herein incorporated in its entirety by reference.

From the scanner LnScn, the illumination beam passes through one or more optics, in this case a scanning lens SL and an ophthalmic or ocular lens OL, that allow for the pupil of the eye E to be imaged to an image pupil of the system. Generally, the scan lens SL receives a scanning illumination beam from the scanner LnScn at any of multiple scan angles (incident angles), and produces scanning line beam SB with a substantially flat surface focal plane (e.g., a collimated light path). Ophthalmic lens OL may focus the scanning line beam SB onto the fundus F (or retina) of eye E and image the fundus. In this manner, scanning line beam SB creates a traversing scan line that travels across the fundus F. One possible configuration for these optics is a Kepler type telescope wherein the distance between the two lenses is selected to create an approximately telecentric intermediate fundus image (4-f configuration). The ophthalmic lens OL could be a single lens, an achromatic lens, or an arrangement of different lenses. All lenses could be refractive, diffractive, reflective or hybrid as known to one skilled in the art. The focal length(s) of the ophthalmic lens OL, scan lens SL and the size and/or form of the pupil splitting mirror SM and scanner LnScn could be different depending on the desired field of view (FOV), and so an arrangement in which multiple components can be switched in and out of the beam path, for example by using a flip in optic, a motorized wheel, or a detachable optical element, depending on the field of view can be envisioned. Since the field of view change results in a different beam size on the pupil, the pupil splitting can also be changed in conjunction with the change to the FOV. For example, a 45° to 60° field of view is a typical, or standard, FOV for fundus cameras. Higher fields of view, e.g., a widefield FOV, of 60°-120°, or more, may also be feasible. A widefield FOV may be desired for a combination of the Broad-Line Fundus Imager (BLFI) with another imaging modalities such as optical coherence tomography (OCT). The upper limit for the field of view may be determined by the accessible working distance in combination with the physiological conditions around the human eye. Because a typical human retina has a FOV of 140° horizontal and 80°-100° vertical, it may be desirable to have an asymmetrical field of view for the highest possible FOV on the system.

The scanning line beam SB passes through the pupil Ppl of the eye E and is directed towards the retinal, or fundus, surface F. The scanner LnScn1 adjusts the location of the light on the retina, or fundus, F such that a range of transverse locations on the eye E are illuminated. Reflected or scattered light (or emitted light in the case of fluorescence imaging) is directed back along as similar path as the illumination to define a collection beam CB on a detection path to camera Cmr.

In the "scan-descan" configuration of the present, exemplary slit scanning ophthalmic system SLO-1, light returning from the eye E is "descanned" by scanner LnScn on its way to pupil splitting mirror SM. That is, scanner LnScn scans the illumination beam from pupil splitting mirror SM to define the scanning illumination beam SB across eye E, but since scanner LnScn also receives returning light from eye E at the same scan position, scanner LnScn has the effect of descanning the returning light (e.g., cancelling the scanning action) to define a non-scanning (e.g., steady or stationary) collection beam from scanner LnScn to pupil splitting mirror SM, which folds the collection beam toward camera Cmr. At the pupil splitting mirror SM, the reflected light (or emitted light in the case of fluorescence imaging) is separated from the illumination light onto the detection path directed towards camera Cmr, which may be a digital camera having a photo sensor to capture an image. An imaging (e.g., objective) lens ImgT may be positioned in the detection path to image the fundus to the camera Cmr. As is the case for objective lens ObjL, imaging lens ImgL may be any type of lens known in the art (e.g., refractive, diffractive, reflective or hybrid lens). Additional operational details, in particular, ways to reduce artifacts in images, are described in PCT Publication No. WO2016/124644, the contents of which are herein incorporated in their entirety by reference. The camera Cmr captures the received image, e.g., it creates an image file, which can be further processed by one or more (electronic) processors or computing devices (e.g., the computer system shown in FIG. 44). Thus, the collection beam (returning from all scan positions of the scanning line beam SB) is collected by the camera Cmr, and a full-frame image Img may be constructed from a composite of the individually captured collection beams, such as by montaging. However, other scanning configuration are also contemplated, including ones where the illumination beam is scanned across the eye E and the collection beam is scanned across a photo sensor array of the camera. PCT Publication WO 2012/059236 and US Patent Publication No. 2015/0131050, herein incorporated by reference, describe several embodiments of slit scanning ophthalmoscopes including various designs where the returning light is swept across the camera's photo sensor array and where the returning light is not swept across the camera's photo sensor array.

In the present example, the camera Cmr is connected to a processor (e.g., processing module) Proc and a display (e.g., displaying module, computer screen, electronic screen, etc.) Dspl, both of which can be part of the image system itself, or may be part of separate, dedicated processing and/or displaying unit(s), such as a computer system wherein data is passed from the camera Cmr to the computer system over a cable or computer network including wireless networks. The display and processor can be an all in one unit. The display can be a traditional electronic display/screen or of the touch screen type and can include a user interface for displaying information to and receiving information from an instrument operator, or user. The user can interact with the display using any type of user input device as known in the art including, but not limited to, mouse, knobs, buttons, pointer, and touch screen.

It may be desirable for a patient's gaze to remain fixed while imaging is carried out. One way to achieve this is to provide a fixation target that the patient can be directed to stare at. Fixation targets can be internal or external to the instrument depending on what area of the eye is to be imaged. One embodiment of an internal fixation target is shown in FIG. 50. In addition to the primary light source LtSrc used for imaging, a second optional light source FxLtSrc, such as one or more LEDs, can be positioned such that a light pattern is imaged to the retina using lens FxL, scanning element FxScn and reflector/mirror FxM. Fixation scanner FxScn can move the position of the light pattern and reflector FxM directs the light pattern from fixation scanner FxScn to the fundus F of eye E. Preferably, fixation scanner FxScn is position such that it is located at the pupil plane of the system so that the light pattern on the retina/fundus can be moved depending on the desired fixation location.

Slit-scanning ophthalmoscope systems are capable of operating in different imaging modes depending on the light source and wavelength selective filtering elements employed. True color reflectance imaging (imaging similar to that observed by the clinician when examining the eye using a hand-held or slit lamp ophthalmoscope) can be achieved when imaging the eye with a sequence of colored LEDs (red, blue, and green). Images of each color can be built up in steps with each LED turned on at each scanning position or each color image can be taken in its entirety separately. The three, color images can be combined to display the true color image, or they can be displayed individually to highlight different features of the retina. The red channel best highlights the choroid, the green channel highlights the retina, and the blue channel highlights the anterior retinal layers. Additionally, light at specific frequencies (e.g., individual colored LEDs or lasers) can be used to excite different fluorophores in the eye (e.g., autofluorescence) and the resulting fluorescence can be detected by filtering out the excitation wavelength.

The fundus imaging system can also provide an infrared reflectance image, such as by using an infrared laser (or other infrared light source). The infrared (IR) mode is advantageous in that the eye is not sensitive to the IR wavelengths. This may permit a user to continuously take images without disturbing the eye (e.g., in a preview/alignment mode) to aid the user during alignment of the instrument. Also, the IR wavelengths have increased penetration through tissue and may provide improved visualization of choroidal structures. In addition, fluorescein angiography (FA) and indocyanine green (ICG) angiography imaging can be accomplished by collecting images after a fluorescent dye has been injected into the subject's bloodstream.

Optical Coherence Tomography Imaging System

In addition to fundus photography, fundus auto-fluorescence (FAF), fluorescein angiography (FA), ophthalmic images may also be created by other imaging modalities, such as, optical coherence tomography (OCT), OCT angiography (OCTA), and/or ocular ultrasonography. The present invention, or at least portions of the present invention with minor modification(s) as it would be understood in the art, may be applied to these other ophthalmic imaging modalities. More specifically, the present invention may also be applied to ophthalmic images produces by an OCT/OCTA system producing OCT and/or OCTA images. For instance, the present invention may be applied to en face OCT/OCTA images. Examples of fundus imagers are provided in U.S. Pat. Nos. 8,967,806 and 8,998,411, examples of OCT systems are provided in U.S. Pat. Nos. 6,741,359 and 9,706,915, and examples of an OCTA imaging system may be found in U.S. Pat. Nos. 9,700,206 and 9,759,544, all of which are herein incorporated in their entirety by reference. For the sake of completeness, an exemplary OCT/OCTA system is provided herein.

Figure 51:
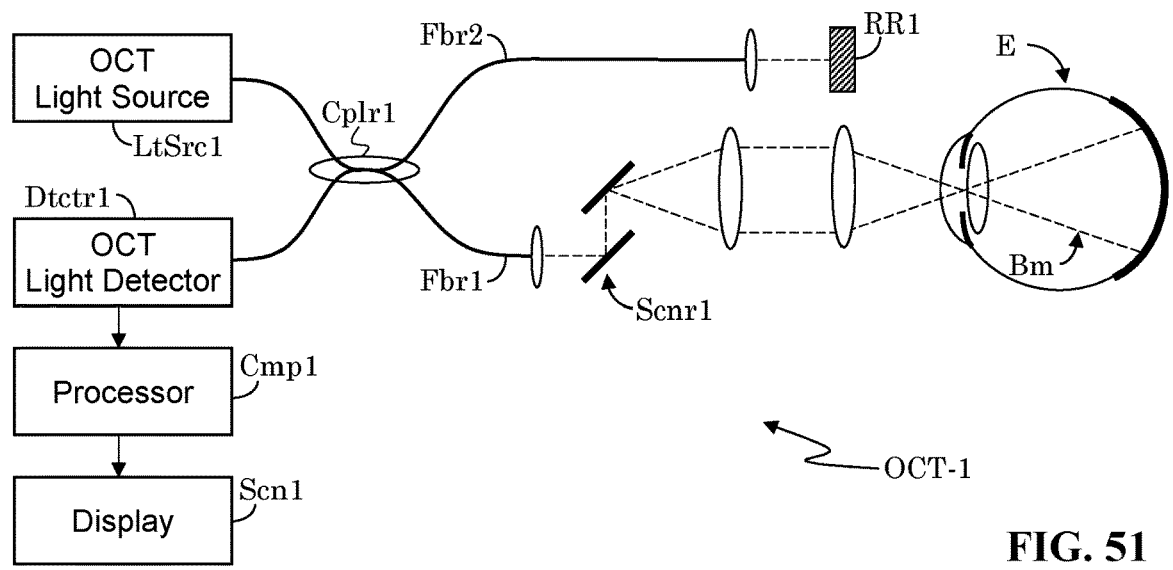
FIG. 51 illustrates a generalized frequency domain optical coherence tomography system used to collect 3-D image data of the eye suitable for use with some embodiments of the present invention.

FIG. 51 illustrates a generalized frequency domain optical coherence tomography (FD-OCT) system used to collect 3-D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 can be either a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally (in x and y) over the region of the sample to be imaged. In the case of a full-field OCT, no scanner is needed and the light is applied across the entire, desired field of view (FOV) at once. Light scattered from the sample is collected, typically into the same optical fiber Fbr1 used to route the light for illumination. Reference light derived from the same light source LtSrc1 travels a separate path, in this case involving optical fiber Fbr2 and retro-reflector RR1 with an adjustable optical delay. Those skilled in the art will recognize that a transmissive reference path can also be used and that the adjustable delay could be placed in the sample or reference arm of the interferometer. Collected sample light is combined with reference light, typically in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor Cmp1 (e.g., computing device) that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument or functions may be performed on an external processing unit (e.g., the computer system shown in FIG. 53) to which the collected data is transferred. This unit could be dedicated to data processing or perform other tasks which are quite general and not dedicated to the OCT device. The processor Cmp1 may contain, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that performs some, or the entire data processing steps, prior to passing on to the host processor or in a parallelized fashion.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy—holographic optical coherence tomography" Optics Letters 36(13): 2390 2011; Y. Nakamura, et al, "High-Speed three dimensional human retinal imaging by line field spectral domain optical coherence tomography" Optics Express 15(12):7103 2007; Blazkiewicz et al, "Signal-to-noise ratio study of full-field Fourier-domain optical coherence tomography" Applied Optics 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|e^{i\varphi}$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow. A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross sectional image that includes the z-dimension.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An en face image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

Figure 52:
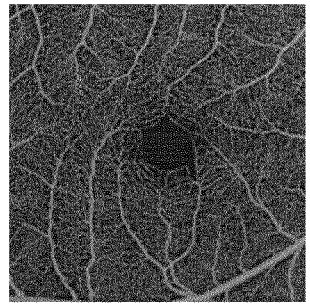
FIG. 52 shows an example of an en face vasculature image.

FIG. 52 shows an example of an en face vasculature image. After processing the data to highlight motion contrast using any of the motion contrast techniques known in the art, a range of pixels corresponding to a given tissue depth from the surface of internal limiting membrane (ILM) in retina, may be summed to generate the en face (e.g., frontal view) image of the vasculature.

Computing Device/System

Figure 53:
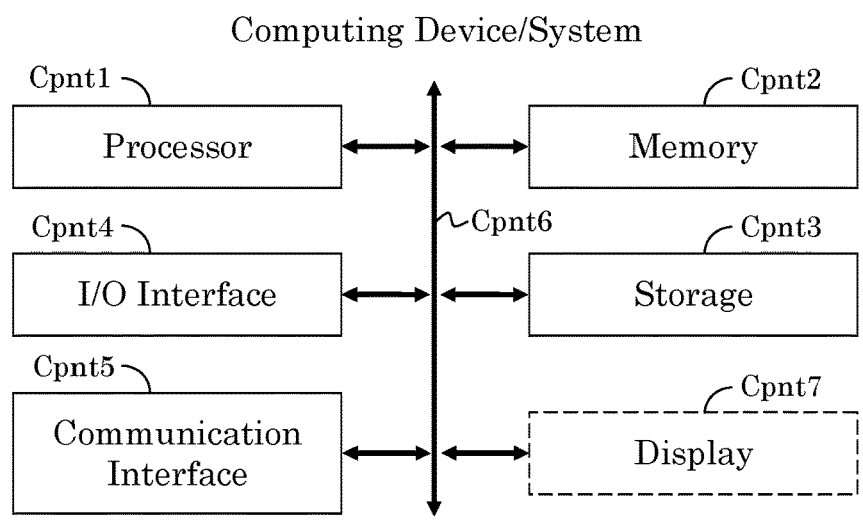
FIG. 53 illustrates an example computer system (or computing device or computer).

FIG. 53 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache. During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network. Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductorbased or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. An ophthalmic imaging system for imaging a target region of an eye, comprising:
    a light source creating an illumination beam;
    a first optical element receiving the illumination beam and focusing the illumination beam along a non-collimated path;
    a beam scanning mechanism in the non-collimated path and positioned at a conjugate plane of the target region, the beam scanning mechanism having an entrance receiving the illumination beam from the first optical element, and having an exit outputting a scan beam whose scanning position is dependent upon motion of the scanning mechanism; and
    a second optical element receiving the scan beam from the beam scanning mechanism, the second optical element focusing the scan beam onto the target region of the eye.

2. The system of claim 1, wherein the target region is the retina of the eye, and the beam scanning mechanism is positioned at a retina conjugate of the eye.

3. The system of claim 1, wherein the beam scanning mechanism includes a K-mirror.

4. The system of claim 1, wherein the beam scanning mechanism receives the illumination beam along the direction of the optical axis, and outputs the scan beam along the same direction of the optical axis.

5. The system of claim 1, wherein:
    the first optical element is a scan lens, the second optical element is an ocular lens, and the scan lens focusses the illumination beam to a focal point within the beam scanning mechanism.

6. The system of claim 1, wherein the illumination beam is a line beam that traverses an axial output direction of the light source.

7. The system of claim 1, wherein the beam scanning mechanism is rotatable to define a two-dimensional illumination pattern comprised of the scan beam rotated by the rotation of the beam scanning mechanism.

8. The system of claim 1, wherein the beam scanning mechanism includes a plurality of reflective surfaces including an output-facing reflective surface at the exit that outputs the scan beam, the output-facing reflective surface being configurable to be radially displaced and impart a corresponding radial displacement to the scan beam.

9. The system of claim 8, wherein the output-facing reflective surface is at a predefined angle to the exit axis of the scanning mechanism, and wherein the output-facing reflective surface is radially displaced along the predefined angle, the illumination beam is a line beam having a first length, and the scan beam is radially displaced by at least the length of the line beam.

10. The system of claim 9, wherein the illumination pattern has an annular shape.

11. The system of claim 1, wherein the beam scanning mechanism rotates about the axis of the output scan beam, and the output scan beam rotates a multiple of times for each rotation of the beam scanning mechanism, the multiple of times excluding a multiple of one.

12. The system of claim 1, wherein the ophthalmic imaging system is an optical coherence tomography system (OCT), optical coherence tomography angiography system (OCTA), or fundus imaging system.

13. The system of claim 1, wherein the light source is a linear series of light emitting diodes (LEDs), each selectively actuatable.

14. The system of claim 1, wherein the light source is a circular arrangement of light emitting diodes (LEDs) actuatable in a predefined pattern.

15. The system of claim 1, wherein the beam scanning mechanism includes at least one frequency-selective optic that is reflective to a first beam frequency and transmissive to a second beam frequency, the beam scanning mechanism defining a second light path directing light of the second beam frequency to the exit.

16. The system of claim 15, wherein the illumination beam at the entrance to the beam scanning mechanism includes a first light component of said first beam frequency and a second light component of said second beam frequency, the output scan beam is defined by the first light component, and the second light component defines a fixation image along the second light path to the exit.

17. The system of claim 1, wherein the beam scanning mechanism includes at least one mirror that has a first surface reflective to the illumination beam received at the entrance and a second surface that is transmissive to a second illumination beam, the second surface being opposite the first surface and forming a second entrance to the beam scanning mechanism.

18. The system of claim 1, further comprising a motion translation mechanism coupled to the beam scanning mechanism and imparting one-dimensional translational motion to the beam scanning mechanism.

19. The system of claim 18, wherein the motion translation mechanism includes a parallel flexture.

20. The system of claim 19, wherein the motion translation mechanism includes an inductive actuator or motor with excenter.

21. The system of claim 1, further comprising a scanning system including a first scanning component that produces a first scanning signal input to a second scanning component that includes said beam scanning mechanism;
    wherein the first scanning component is positioned at a pupil conjugate of the eye, and second scanning component is positioned at a retina conjugate of the eye.

22. The system of claim 21, wherein the first scanning component includes galvanometer positioned at the pupil conjugate and the beam scanning mechanism is positioned at the retina conjugate.

* * * * *